US008796495B2

(12) United States Patent
Lux et al.

(10) Patent No.: US 8,796,495 B2
(45) Date of Patent: Aug. 5, 2014

(54) METHODS AND SYSTEMS FOR CONVERTING WASTE INTO COMPLEX HYDROCARBONS

(75) Inventors: Richard P. Lux, St. Louis, MO (US); Christopher M. Reeves, St. Charles, MO (US); Gary Eugene Winkler, St. Louis, MO (US)

(73) Assignee: Innoventor Renewable Power, Inc., St. Louis, MO (US)

( * ) Notice: Subject to any disclaimer, the term of this patent is extended or adjusted under 35 U.S.C. 154(b) by 193 days.

(21) Appl. No.: 13/161,756

(22) Filed: Jun. 16, 2011

(65) Prior Publication Data

US 2011/0257307 A1    Oct. 20, 2011

Related U.S. Application Data

(60) Division of application No. 12/368,734, filed on Feb. 10, 2009, now Pat. No. 7,985,345, which is a continuation-in-part of application No. 11/506,011, filed on Aug. 17, 2006, now Pat. No. 7,597,812, which is a division of application No. 10/812,153, filed on Mar. 29, 2004, now Pat. No. 7,105,088.

(51) Int. Cl.
*C07C 1/00* (2006.01)
*C02F 11/12* (2006.01)
*C02F 11/10* (2006.01)
*C08L 95/00* (2006.01)
*C02F 103/20* (2006.01)

(52) U.S. Cl.
CPC .............. *C02F 11/10* (2013.01); *C02F 11/12* (2013.01); *C02F 2103/20* (2013.01); *C08L 95/00* (2013.01); *C10G 2300/1003* (2013.01)
USPC .......................... 585/240; 106/273.1; 106/668

(58) Field of Classification Search
CPC ..... C08L 95/00; C08L 99/00; C08L 2205/03; C02F 11/10; C02F 11/12; C02F 1/001; C02F 1/38; C02F 2103/20; C02F 2303/24; C10G 1/008; C10G 2300/1003
USPC ......... 34/380, 397, 398; 73/73; 110/219, 221, 110/224; 585/240; 106/668, 671, 273.1
See application file for complete search history.

(56) References Cited

U.S. PATENT DOCUMENTS 3,733,255 A    5/1973   Apell et al.
3,832,200 A *  8/1974   Kennel et al. ............ 106/284.01
(Continued)

FOREIGN PATENT DOCUMENTS

EP        0549379 A1    6/1993
EP        1182248 A1    2/2002
(Continued)

OTHER PUBLICATIONS

PCT Foreign Search Report for Application No. PCT/US2010/23289 dated Apr. 9, 2010.

(Continued)

*Primary Examiner* — Frank Lawrence
(74) *Attorney, Agent, or Firm* — Armstrong Teasdale LLP

(57) ABSTRACT

A method for receiving animal waste from animal confinements or other concentrated animal waste sources and for converting the waste into a complex hydrocarbon is described. The waste contains both liquids and solids. The method includes separating the liquids and solids into separate waste streams, controlling an amount of moisture in the solids waste stream such that the amount of moisture in the solid waste stream is compatible with a selected energy conversion process, and feeding the moisture controlled solid waste into the energy conversion process. The complex hydrocarbon may be suitable for use as a substitute or additive to petroleum-based asphalt binder.

22 Claims, 11 Drawing Sheets

(56) References Cited

U.S. PATENT DOCUMENTS

| | | | |
|---|---|---|---|
| 3,907,582 A * | 9/1975 | Walter | 106/284.01 |
| 4,135,888 A | 1/1979 | Waltrip | |
| 4,177,079 A | 12/1979 | Espenscheid | |
| 4,184,892 A | 1/1980 | Anderson | |
| 4,290,269 A | 9/1981 | Hedstrom et al. | |
| 4,321,151 A | 3/1982 | McMullen | |
| 4,344,770 A | 8/1982 | Capener et al. | |
| 4,364,745 A | 12/1982 | Weil | |
| 4,750,454 A | 6/1988 | Santina et al. | |
| 4,818,405 A | 4/1989 | Vroom et al. | |
| 4,842,728 A | 6/1989 | Baker | |
| 5,234,494 A * | 8/1993 | Sawatzky et al. | 106/284.4 |
| 5,269,947 A | 12/1993 | Baskis | |
| 5,360,553 A | 11/1994 | Baskis | |
| 5,428,906 A | 7/1995 | Lynam et al. | |
| 5,500,306 A | 3/1996 | Hsu et al. | |
| 5,552,044 A | 9/1996 | Abel | |
| 5,589,599 A | 12/1996 | McMullen et al. | |
| 6,036,774 A | 3/2000 | Lieber et al. | |
| 6,054,044 A | 4/2000 | Hoffland et al. | |
| 6,149,694 A | 11/2000 | Redden, Jr. et al. | |
| 6,190,566 B1 | 2/2001 | Kolber | |
| 6,299,774 B1 | 10/2001 | Ainsworth et al. | |
| 6,398,921 B1 | 6/2002 | Moraski | |
| 6,410,283 B1 | 6/2002 | Rehmat et al. | |
| 6,470,828 B1 | 10/2002 | Townsend et al. | |
| 6,521,129 B1 | 2/2003 | Stamper et al. | |
| 6,531,057 B1 | 3/2003 | Houle | |
| 6,630,072 B2 | 10/2003 | Hoffland | |
| 6,641,720 B1 | 11/2003 | Crompton et al. | |
| 6,663,752 B2 | 12/2003 | Santilli | |
| 6,773,594 B1 | 8/2004 | van der Wijngaart | |
| 6,824,682 B2 | 11/2004 | Branson | |
| 6,887,389 B2 | 5/2005 | Judd | |
| 7,015,028 B2 | 3/2006 | Choate et al. | |
| 7,078,229 B2 | 7/2006 | Dvorak | |
| 7,105,088 B2 | 9/2006 | Schien et al. | |
| 7,597,812 B2 | 10/2009 | Schien | |
| 2001/0013197 A1 | 8/2001 | White | |
| 2002/0030012 A1 | 3/2002 | Sullivan et al. | |
| 2002/0050094 A1 | 5/2002 | Taulbee | |
| 2003/0038078 A1 | 2/2003 | Stamper et al. | |
| 2003/0111410 A1 | 6/2003 | Branson | |
| 2003/0212168 A1 | 11/2003 | White et al. | |
| 2006/0278587 A1 | 12/2006 | Schien et al. | |
| 2007/0006526 A1 | 1/2007 | Cullen | |
| 2008/0147241 A1 | 6/2008 | Tsangaris et al. | |
| 2008/0172899 A1 | 7/2008 | Carin et al. | |
| 2009/0149571 A1 | 6/2009 | Lux et al. | |

FOREIGN PATENT DOCUMENTS

| | | |
|---|---|---|
| FR | 2844804 A1 | 3/2004 |
| WO | 9956073 | 11/1999 |
| WO | 2004046279 A1 | 6/2004 |
| WO | 2005035697 | 4/2005 |

OTHER PUBLICATIONS

European Patent Office Foreign Search Report related to Application No. 05251927.9-2104 PCT dated Aug. 4, 2005.
Ocfemia, Kim Carlo Siapno; Hydrothermal Process of Swine Manure to Oil Using a Continuous Reactor System; Sep. 22, 2005.
International Preliminary Report on Patentability and Written Opinion of PCT/US2010/023289; Aug. 25, 2011; 7 pages.

* cited by examiner

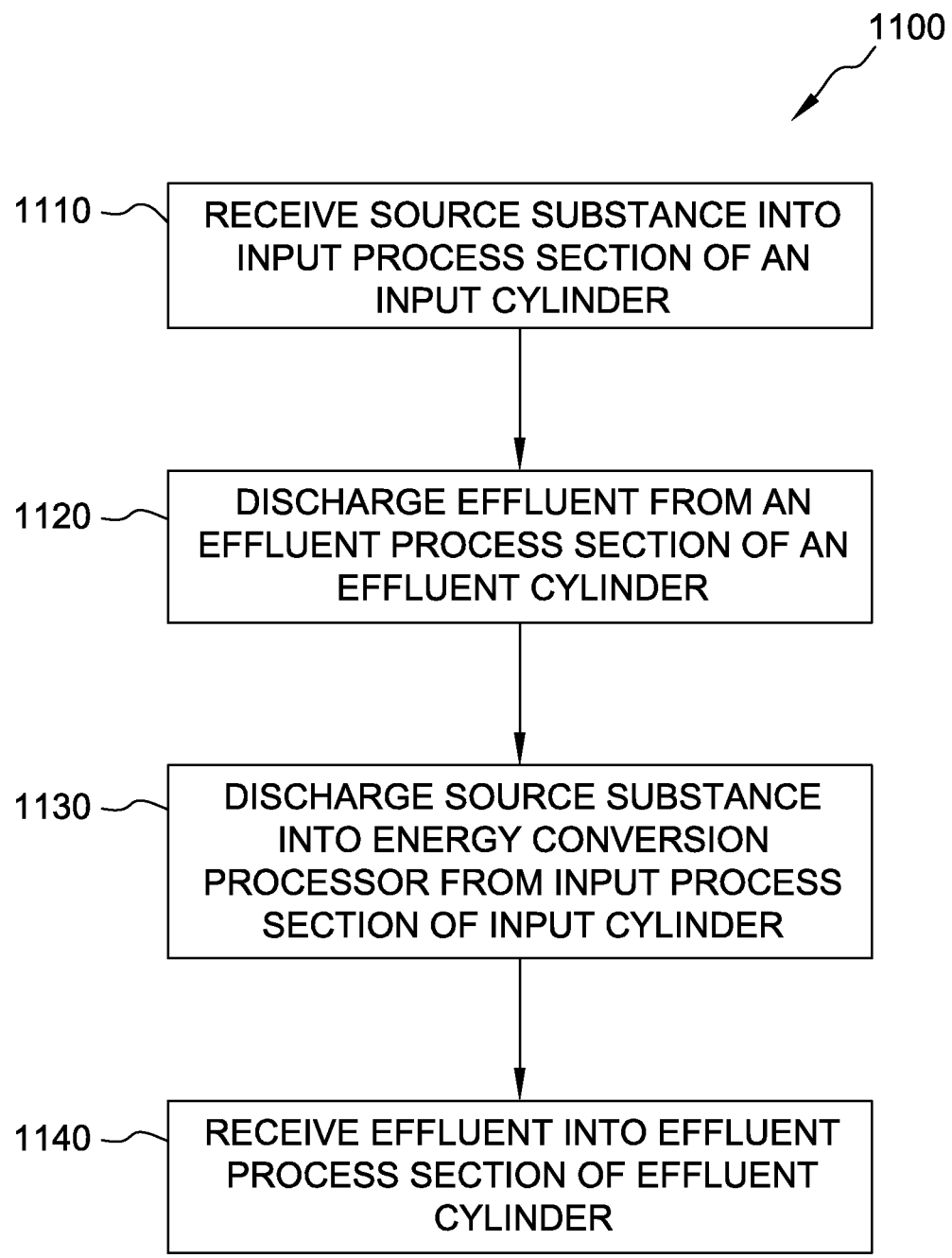

METHODS AND SYSTEMS FOR CONVERTING WASTE INTO COMPLEX HYDROCARBONS

CROSS REFERENCE TO RELATED APPLICATIONS

This Application is a Divisional of U.S. patent application Ser. No. 12/368,734 entitled "Methods and Systems for Converting Waste Into Complex Hydrocarbons", filed Feb. 10, 2009 (now issued U.S. Pat. No. 7,985,345), which is a Continuation-in-Part of U.S. patent application Ser. No. 11/506,011 (now U.S. Pat. No. 7,597,812) entitled "Methods and Systems for Converting Waste Into Energy", filed Aug. 17, 2006, which is a Divisional of U.S. patent application Ser. No. 10/812,153 (now U.S. Pat. No. 7,105,088) entitled "Methods and Systems for Converting Waste Into Energy", filed Mar. 29, 2004. The disclosures of said applications are incorporated by reference in their entirety.

BACKGROUND OF THE INVENTION

This invention relates generally to the problems associated with waste in animal confinements, and more specifically, to methods and systems for converting the resulting high concentrations of animal waste into complex hydrocarbons suitable for other uses.

Animals have been raised for centuries for food. Previously animals grazed in fields or pens, and were at times confined to buildings for shelter. However, current state of the art animal production for swine, cattle, and other animals, includes housing large numbers of such animals in high concentration within confined buildings, and delivering food to the animals. This method of animal production has benefited consumers of meat by lowering food prices through increased efficiency. A drawback to the current methods of animal production includes the resulting high concentration of wastes that have to be removed from the buildings and disposed of in a safe manner.

Typically, the waste is removed from animal confinement buildings and deposited into large lagoons. Once within these lagoons, which can be multi-acre in size, the waste decomposes. The solid and liquid wastes in the lagoons cause an odor problem for the surrounding area, both as it decomposes in the lagoon, and during field application as a fertilizer as further described.

After partially decomposing, the waste from the lagoons is applied to land (e.g. fields where crop are grown) as a fertilizer. The potential for environmental contamination during field application of the waste is substantial and many fields in pork producing states have been over fertilized. In addition, some of the applied fertilizer can become windborne during application and is therefore a source of environmental contamination for adjacent areas.

There are also additional weaknesses with waste lagoon technology, specifically, collapsed walls and ground leaching, both of which can contribute to waterway and well contamination. In a recent EPA report, 60% of the US streams identified as "impaired" were polluted by animal wastewater. Animal wastewater management has become a high priority for the EPA.

Still another problem with current animal production methods is that air cycled through the confinement buildings to keep the animals cool is blown into the atmosphere through the fans at the end of these confinement buildings. This is another source of airborne waste in addition to the fertilizer application problems described above. Another problem caused in part by the airborne waste is an increased susceptibility to respiratory and other health problems in farm workers. Legislative pressures have forced at least one state to impose a moratorium on new swine confinements, and other states are predicted to follow.

There have been numerous attempts to improve the current state of the art in animal production, but most of these attempts still include drawbacks. For example, some still require a waste lagoon. Another system uses an inclined belt to concentrate solids percentage of waste, but does not eliminate or gain beneficial results from the solid waste. Other systems are known in which the wastes are eliminated by burning, but the burning of such wastes is not utilized to provide a beneficial result. Other systems treat waste through chemicals, but the waste is returned to the environment as a dried sludge. Additionally, anaerobic digestion systems exist.

There are additionally several energy conversion processes known but these systems do not describe any methods for getting the waste to the conversion system, nor the overall process of handling the animal waste.

BRIEF DESCRIPTION OF THE INVENTION

In one aspect, a system for processing a waste stream from animal production confinements and other sources of concentrated wastes and converting it into a complex hydrocarbon is provided. The system comprises a solids/liquids separator receiving the waste stream and configured to separate the waste stream into a solid waste stream and a liquid waste stream and a water treatment apparatus for treating the liquid waste stream. The system further comprises a control system for controlling an amount of moisture in the solid waste stream, an energy conversion processor receiving the moisture controlled solid waste stream and converting the solid waste stream into the complex hydrocarbon.

In another aspect, an asphalt binder mixture is provided. The mixture comprises a complex hydrocarbon produced from a waste stream from animal product confinements and other sources of concentrated waste, a polymer-based asphalt binder additive, and a petroleum-based asphalt binder.

According to another aspect, an asphalt mixture is provided. The mixture comprises an asphalt binder produced from animal waste subjected to an energy conversion process and an aggregate.

In another aspect, an asphalt binder comprising a complex hydrocarbon produced from animal waste is provided.

BRIEF DESCRIPTION OF THE DRAWINGS

FIG. 11 is a flow diagram depicting a method of pumping a slurry into the energy conversion processor and receiving an effluent as output from the energy conversion processor, in accordance with another embodiment of the present invention

DETAILED DESCRIPTION OF THE INVENTION

The systems herein described provide methods for handling raw animal waste and converting the waste into fuel, which may then be used for heat, transportation, or preferably direct conversion to power through a generator driven by an engine or combustion turbine.

Figure 1:
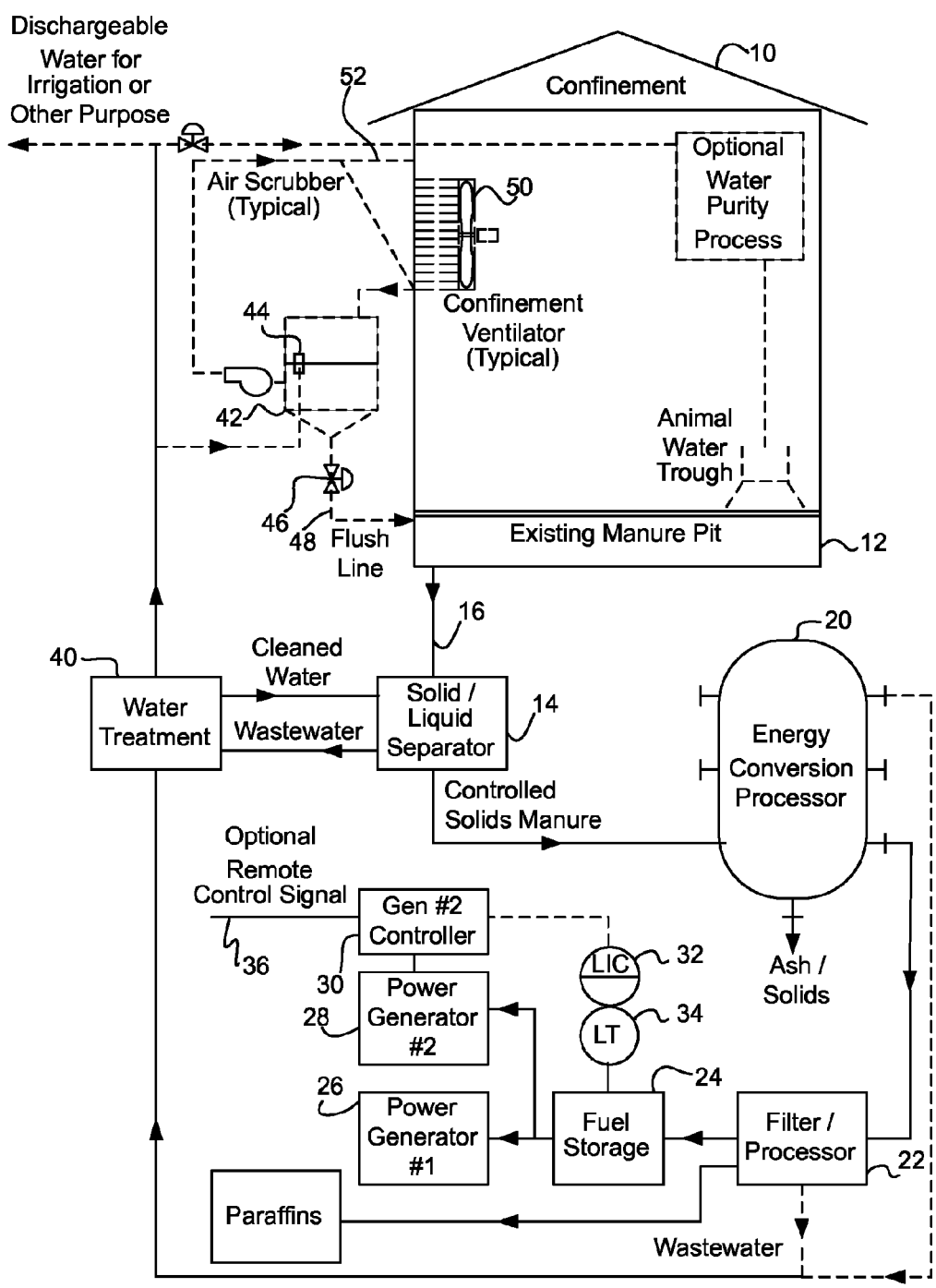
FIG. 1 is an overall conversion process diagram of a system for converting a waste stream into a fuel source, including a solids/liquids separator.

Referring to FIG. 1, animal confinement 10 includes a manure collection area 12 for the collection of wastes and flushing water. The wastes and flushing water are transported to solid/liquid separator 14 utilizing a transporting mechanism 16. In one embodiment, transporting mechanism 16 operates by gravity, but other embodiments of transporting mechanism 16 exist which may also use pumps and/or conveyors in addition to or instead of gravity to transport animal waste and other accompanying materials. As used herein, the term "transport" is utilized to describe methods for moving mass from one location to another, including, but not limited to, pumping, gravity, auger, conveyor, and the like.

In a specific embodiment, a positive displacement pump designed for high solids contents is utilized for transporting animal waste from collection area 12 to solid/liquid separator 14. One positive displacement pump is a grinding pump, one example of which is a Moyno L-Frame progressing cavity pump.

Solid/liquid separator 14 may include one or more mechanical and gravity separators which are further described below. A gravity separator is sometimes referred to as a settling tank. In one embodiment, solid/liquid separator 14 is utilized to deliver volatile solids from the waste, which have a significant BTU content for use as fuel, to an energy conversion processor 20. As further described below, the solid wastes are delivered to energy conversion processor 20 within a specified range of moisture content.

The animal waste exiting manure collection area 12 is typically about 97% to about 99.5% liquid. This is a result of manure by nature being very wet. Additional moisture is added due to urine and the water used to flush the animal waste from confinement 10. Small additional amounts of water are contributed to the animal waste by sloppy drinking and animal cleaning. Hog manure, for example, is typically about 80%-90% liquid by weight.

Each embodiment of energy conversion processor 20 has a range for the moisture content of the solid waste being converted that enables proper conversion of the solid waste. For example, the well-known gasification process typically requires a relatively dry feedstock, for example, a fuel with about a 20% to about a 30% moisture level. By contrast, other conversion processes such as liquification or pyrolysis allow much wetter feedstock streams, up to about an 80% moisture level.

As described above, the animal waste is transported into energy conversion processor, which may use pyrolysis, gasification, or one of a number of related conversion processes that utilize controlled temperature, pressure, and time to convert the waste into a one of a fuel gas, an oil, a solid, or a combination thereof. The converted animal waste is referred to herein as "fuel".

From energy conversion processor 20, the fuel is filtered and processed by filter processor 22 as necessary for usage. In one embodiment, the system includes one or more optional fuel storage tanks 24, or buffer tank(s). The fuel is then converted into electricity through a known device such as an engine or turbine-driven generator 26.

In the embodiment illustrated, a second power generator 28 is illustrated. In many locations, electrical power is more valuable during "peak demand" periods. One feature of the system illustrated is that power generator 26 is utilized to supply a certain quantity of power, while second power generator 28 supplies another quantity. Power generator 26 and second power generator 28 may provide equal power or may provide different power amounts (i.e., be differently sized). In a particular embodiment, power generator 26 supplies electricity and engine heat sufficient to keep the processes of the illustrated system continuously running except for maintenance. Second power generator 28 is turned on when power demand is at a peak. In a specific embodiment, power generator 26 is a Kohler 150REOZV and second power generator 28 is a Kohler 500REOZV.

Operation of second power generator 28, in one embodiment, is controlled by a controller 30, which includes a timer (not shown), operating in conjunction with a level controller 32, having a sensor input 34. Controller 30 may also be controlled remotely by a remote signal 36 from a utility or an operator of the energy conversion system illustrated. This operation enables the energy conversion system to meet electrical load demand and also maximize economic benefit to the system's owner. Such operation provides benefits to the public and the electrical grid operators by reducing loading on transmission lines, by providing demand-based distributed generation. Additionally, fuel production will vary due to fluctuations in manure production and other factors. The twin power generator arrangement provides a solution for the fluctuations in fuel supply while allowing generators to run at peak efficiency.

There is typically wastewater generated by the energy conversion system in the conversion process, either within energy conversion processor 20 or in filter/processor 22. This wastewater is transported, by pump and/or gravity, to a water treatment apparatus 40, which removes any remaining entrained solids, liquids and gases to levels approved by the applicable authorities. Water from water treatment apparatus 40 is either discharged to water bodies, or used for crop irrigation, or any number of other useful purposes that displace water currently taken from ground sources and/or water bodies.

In a particular embodiment, the water is transported back to confinement 10 for a variety of purposes. As illustrated in FIG. 1, a holding tank 42 has a level control valve 44 that allows holding tank 42 to fill as needed. A control valve and/or pump 46 transmits the water through a flush line 48 into manure pit 12 as needed in order to provide the flushing water needed to clean manure out of confinement 10.

In one embodiment, water is also pumped to devices which filter the air exiting confinement 10 via ventilation system 50. An example of such a device is an air scrubber 52 as described in U.S. Pat. No. 6,059,865. Water washes down an inclined plate (not shown) of air scrubber 52, as ventilation fans blow against the inclined plate. Odor containing particles and gases are captured within the water stream. This water is shown as being returned to holding tank 42. The water can alternately be returned to water treatment apparatus 40 or utilized directly for flushing of manure pit 12.

Figure 2:
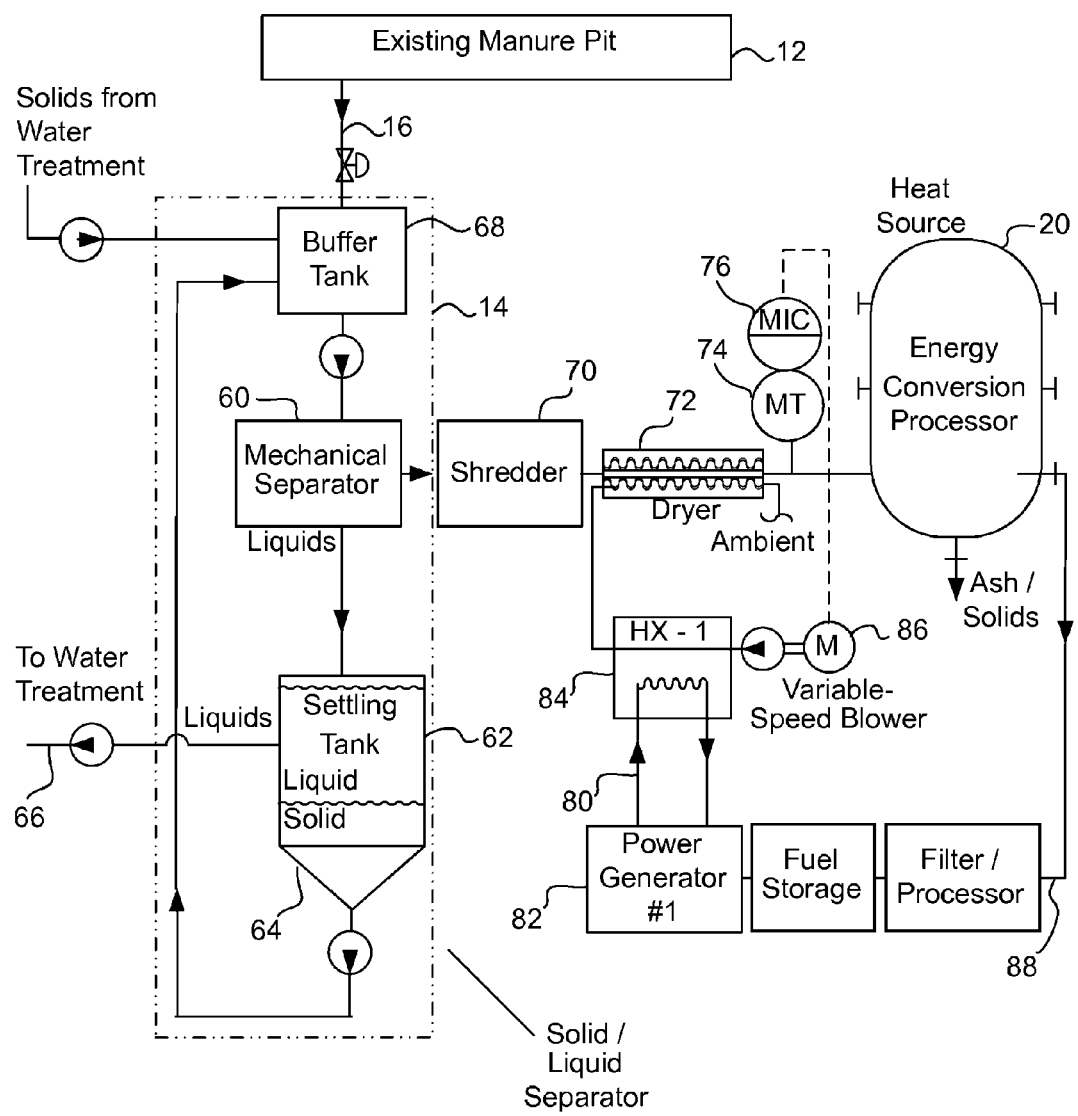
FIG. 2 is a block diagram of a portion of the system of FIG. 1, including an embodiment of a solids/liquids separator for a waste stream including a high solids concentration.

FIG. 2 illustrates one embodiment of solid/liquid separator 14 (shown in FIG. 1). Certain energy conversion processes utilize a low moisture level, for example, gasification. In such energy conversion processes, solid/liquid separator 14 may include one or more mechanical separators 60. Individual mechanical separators 60 may be a type of press (e.g., a belt press), an auger, a conveyor, a centrifuge, a hydrocyclone, a screen separator, or another type of mechanical separator, alone, or in conjunction with one or more other mechanical separators that work in conjunction to remove substantially all of the useful volatile solids from the waste. At least some known mechanical separation equipment leaves much of the useful volatile solids in the wastewater.

In the embodiment of solid/liquid separator 14 illustrated in FIG. 2, any solids retained in the waste are forwarded from mechanical separator 60 to settling tank 62, either by gravity and/or by pumping. Some examples of mechanical separator 60 are the KCS&C 48×30 Centrifuge, or Vincent KP-6L Screw Press. Settling tank 62 allows the retained solids to gravitate toward a bottom 64 of a fixed tank, while the liquid portion is forwarded for water treatment 66. In additional embodiments, settling tank 62 may include more than one settling tank in series or parallel. The solids that gravitate toward bottom 64 of settling tank 62 are transported back to mechanical separator 60, either directly, or to a buffer tank 68, as illustrated in FIG. 2.

The solids stream from mechanical separator 60 are forwarded, in one embodiment, to a shredder 70. A shredder 70 may not be needed for some animal waste streams, and its function may be replaced by a standard pump or a grinding pump. The waste is then transported, either by pump or gravity, to a dryer 72. In the embodiment shown in FIG. 2, dryer 72 is a helical auger in which heat and/or air is added to the unit, lowering the moisture content of the waste to meet the operating conditions of energy conversion processor 20. In the embodiment shown, moisture content of the waste is controlled by a moisture sensor 74 that monitors the amount of heat and airflow entering dryer 72. Moisture sensor 74 provides an analog or digital signal to the moisture controller (MIC) 76. Moisture controller 76 is configured to vary a process variable to control the moisture level of the waste within pre-defined limitations for use by energy conversion processor 20. A particular embodiment utilizes an Omega CDCE-90-1 moisture sensor, and an Omega CDCN-90 moisture controller. In this embodiment, moisture sensor 74 provides a proportional signal to moisture controller 76. An output of moisture controller 76 is utilized to control devices affecting the moisture percentage of the waste.

In particular embodiments, if moisture sensor 74 indicates that the moisture percentage is too high to be processed properly by energy conversion processor 20, then a hot air flow that is applied to the waste stream entering energy conversion processor 20 is increased. The hot air may be generated utilizing a variety of methods and one exemplary embodiment is illustrated in FIG. 2, where a coolant 80 from a power generator 82 is passed through a heat exchanger 84, where heat is transferred to the incoming air in order to raise its temperature, which increases its capacity to remove moisture from the process stream. A variable speed blower 86 has a variable frequency drive or other modulating device such as a mechanical damper, that is controlled by the signal output by moisture controller 76. In a specific embodiment, heat exchanger 84 is a pipe-in-pipe heat exchanger manufactured by a variety of other manufacturers and blower 86 is manufactured by the New York Blower Company.

In other embodiments, drying methods include raising the temperature of the waste through electric or fuel fired heaters or heat exchanged from other higher temperature areas of the process via fluid, gas or steam heat exchange media. Alternately, gases from engine exhaust of power generator 82 or energy conversion processor 20 can be utilized directly, similarly to the hot air embodiment above described.

In one embodiment, dryer 72 includes a perforated top screen (not shown) which allows the warmed moist air to escape. In other embodiments, the airflow is constant, but the amount of heat is varied, for example by a three-way valve modulating the amount of hot engine fluid (e.g., coolant 80) delivered to heat exchanger 84. Alternately other process variables such as rotation speed of dryer 72 or temperature of heating media may be controlled to obtain the same effect. Other heat sources may be used, such as engine exhaust from power generator 82, heat from energy conversion processor 20, heat from the process stream 88 after energy conversion processor 20, solar-heated thermal fluid, or heat from a separate combustion process, such as burning paraffins separated from the resultant fuel.

Figure 3:
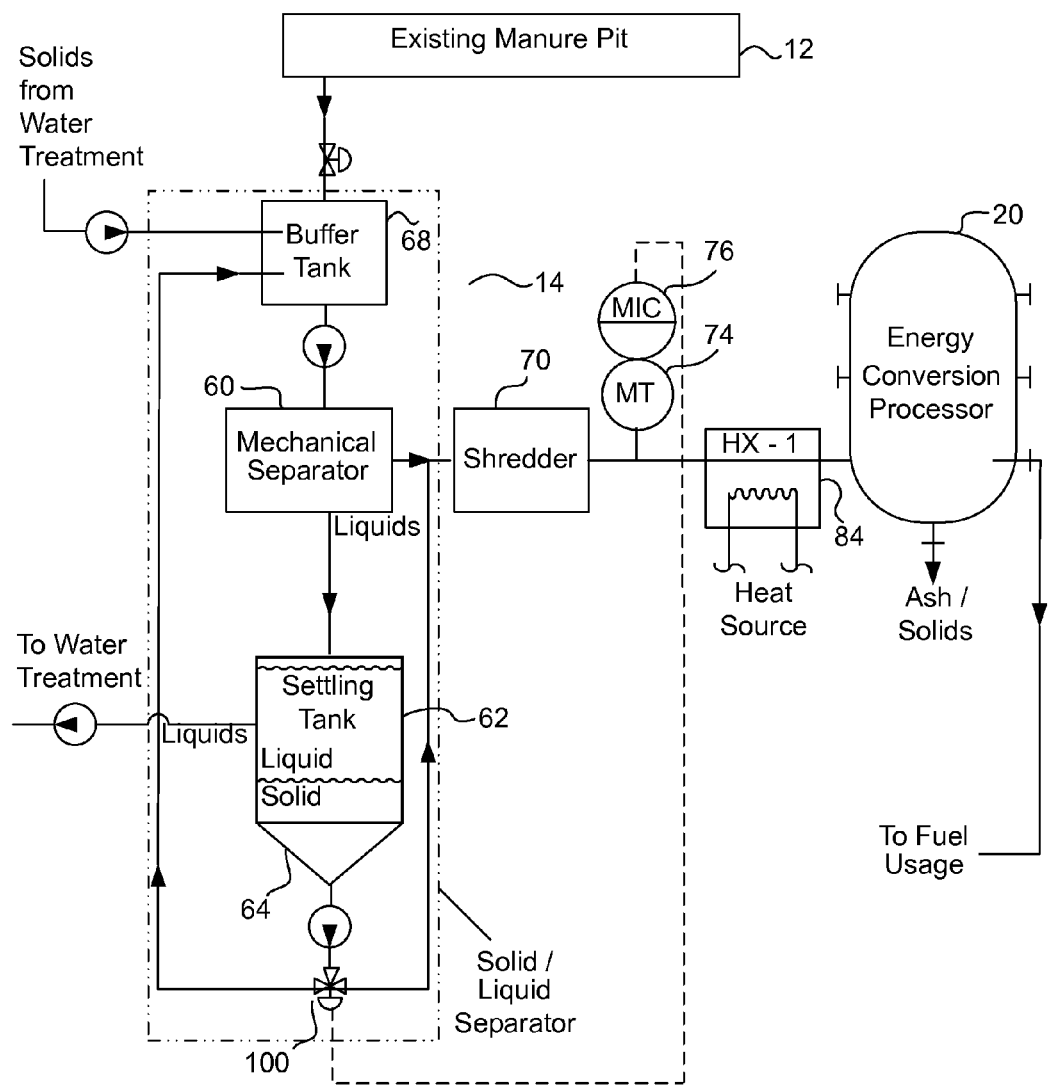
FIG. 3 is a block diagram of a portion of the system of FIG. 1, including an embodiment of a solids/liquids separator for a waste stream including a low solids concentration.

FIG. 3 illustrates an alternate embodiment where energy conversion processor 20 is configured to utilize or allow higher moisture content feedstock (e.g., animal waste streams). In this embodiment, a portion of the solids stream from settling tank 62 is delivered to the line which contains the solid portion from mechanical separator 60. The amount of this stream from settling tank 62 is controlled by moisture controller (MIC) 76, based on an input from moisture sensor 74 or a similar instrumentation means. Alternately the amount of solids from settling tank 62 is controlled by simple experimental manual balancing. In the embodiment illustrated a three way control valve 100 and moisture sensor 74 are used to control the amount of solids from settling tank 62 into the waste stream. Alternatively one or more two-way control valves or solenoid operated valves may be utilized.

The waste stream is exposed to heat from heat exchanger 84 before entry into energy conversion processor 20. The heat for heat exchanger 74 may be provided from a variety of sources. In a specific embodiment, heat may be provided to heat exchanger 84 from a power generator (shown in FIG. 1) from one or more of exhaust and engine cooling water. The waste stream in effect replaces the engine's radiator, in part or in whole. Additional heat sources may be used such as solar thermal, electric heat run by the unit's generator or other power source, or direct firing of a portion of the fuel, or waste fractions of the fuel. The heated waste is then transported to energy conversion processor 20 and processed as described with respect to FIG. 1.

Figure 4:
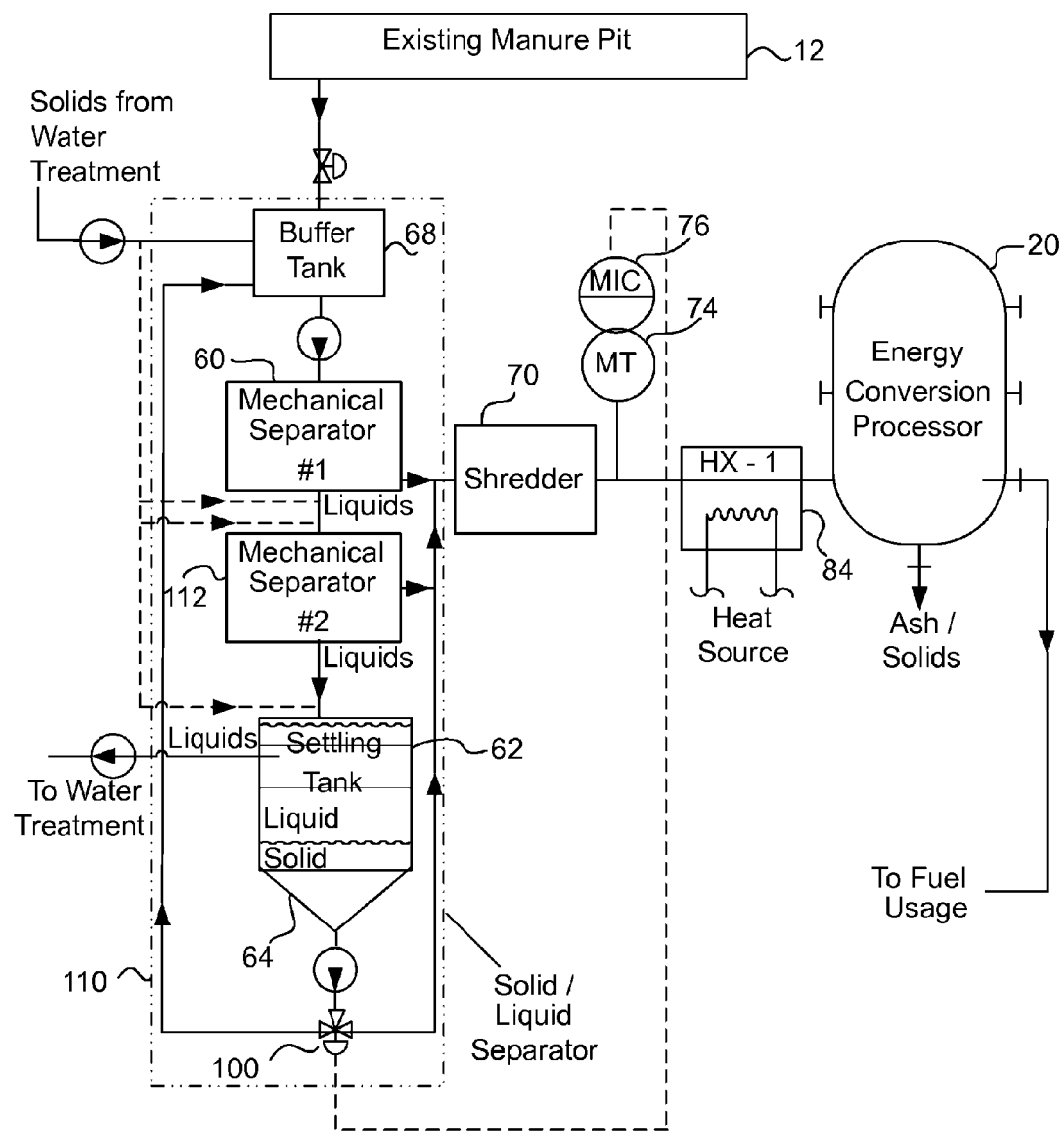
FIG. 4 is a block diagram of a portion of the system of FIG. 1, illustrating an embodiment having multiple mechanical solids/liquids separators.

FIG. 4 illustrates an alternate embodiment of a solids/liquids separator 110 for energy conversion system which increases efficiency of separation between solids and liquids in the waste stream. In addition to mechanical separator 60, a second mechanical separator 112 is included. Mechanical separator 60 and second mechanical separator 112 may be of the same type of construction, but in a specific embodiment, mechanical separator 60 is a highly energy efficient type separator, for example, a press, while second mechanical separator 100 is a more energy intensive separator, such as a centrifuge. In the embodiment, second mechanical separator 112 processes less mass flow than does mechanical separator 60 thereby raising overall efficiency of the energy conversion system. Specifically, mechanical separator 60 directs the high-solids fraction of the waste towards energy conversion processor 20, while a high-liquids fraction of the waste is transported to second mechanical separator 112. Second mechanical separator 112 also directs its high-solids fraction toward energy conversion processor 20, while the high-liquids fraction is directed to settling tank 62. From settling tank 62, a high-solids fraction of the waste is directed back to buffer tank 68 or alternately to one or both of mechanical separators 60, 112 and another fraction is transported toward energy conversion processor 20. Three-way valve 100, which is controlled by moisture controller (MIC) 76, based on the input from moisture sensor 74. Three-way valve 100 varies the amount of high-solids waste fraction transported toward either energy conversion processor 20 and buffer tank 68, or alternately between first and second mechanical separators 60, 112.

Figure 5:
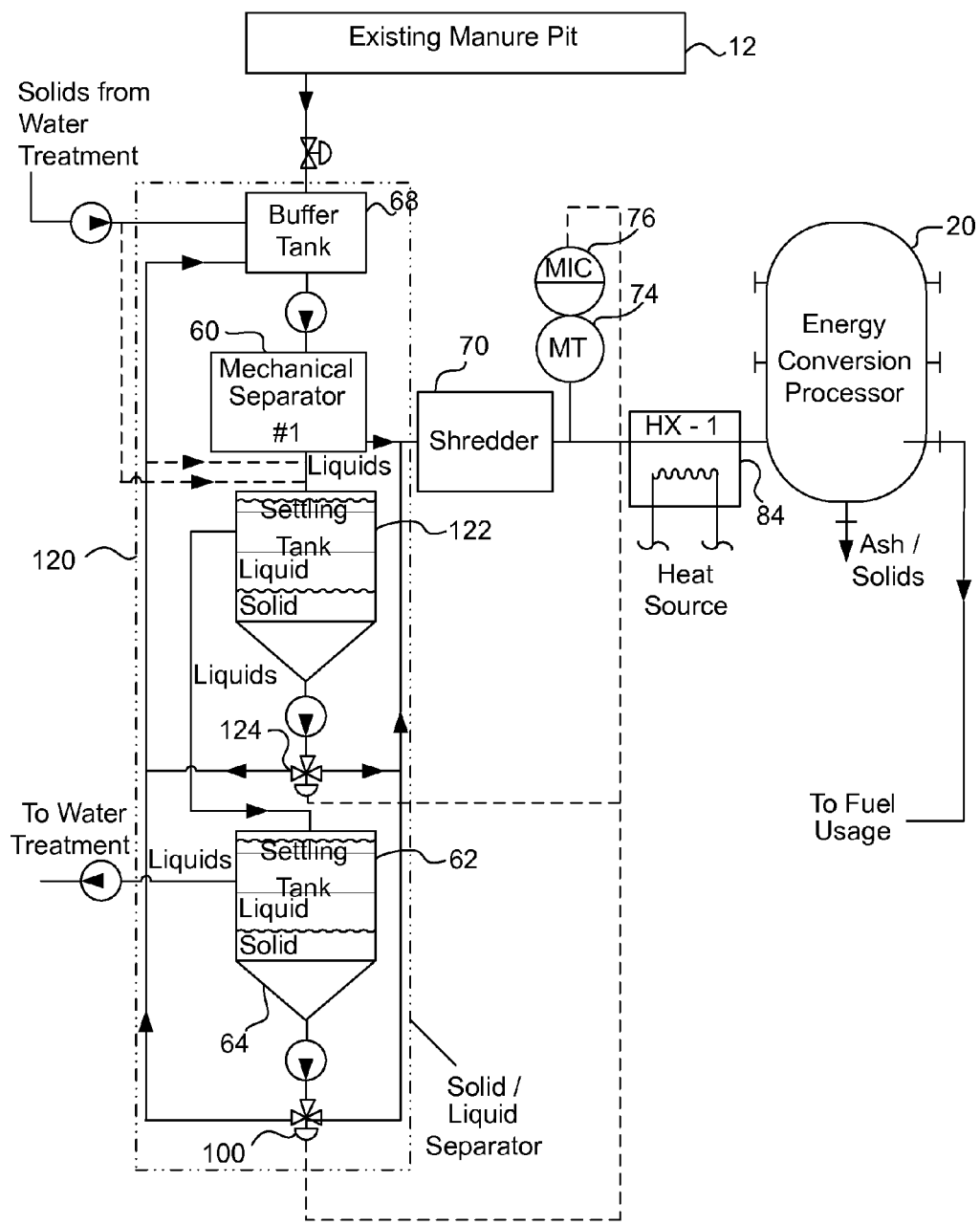
FIG. 5 is a block diagram of a portion of the system of FIG. 1, illustrating an embodiment having multiple gravity solids/liquids separators.

FIG. 5 illustrates another embodiment of a solids/liquids separator 120 for energy conversion system which also increases efficiency of separation between liquids and solids in a waste stream. Solids/liquids separator 120 includes a second settling tank 122, which may be of the same type of construction as settling tank 62, but typically will have a different geometry. Settling tank 122 directs the high-solids fraction of the waste towards energy conversion processor 20, while the high-liquids fraction of the waste from second settling tank 122 is transported to settling tank 62. Settling tank 62 transports its high-liquids fraction to waste water treatment (e.g., apparatus 40 shown in FIG. 1). The prime advantages of gravity separation utilizing settling tanks are low energy consumption and high recovery of solids. Putting two gravity separators in series (i.e., settling tanks 62 and 122) downstream of mechanical separator 60 is thought to recover approximately 97% of the solids. The high-solids fractions of waste from both gravity separators 62, 122 are transported back to buffer tank 68 or combined with an output from mechanical separator 60 and directed to shredder 70 and onto energy conversion processor 20. A three-way valve 124 operates in the same fashion as three way valve 100 described above, that is, controlled by moisture controller (MIC) 76, based on an input from moisture sensor 74. Three-way valves vary an amount of high-solids waste transported toward energy conversion processor 20, buffer tank 68, and mechanical separator 60.

For all of the above described embodiments, it should be easily understood that many variations can be made and still be within the spirit and scope herein described. For example, altering the arrangements and quantity of separators, such as three or more separators in a parallel or series-parallel arrangements are certainly contemplated.

Figure 6:
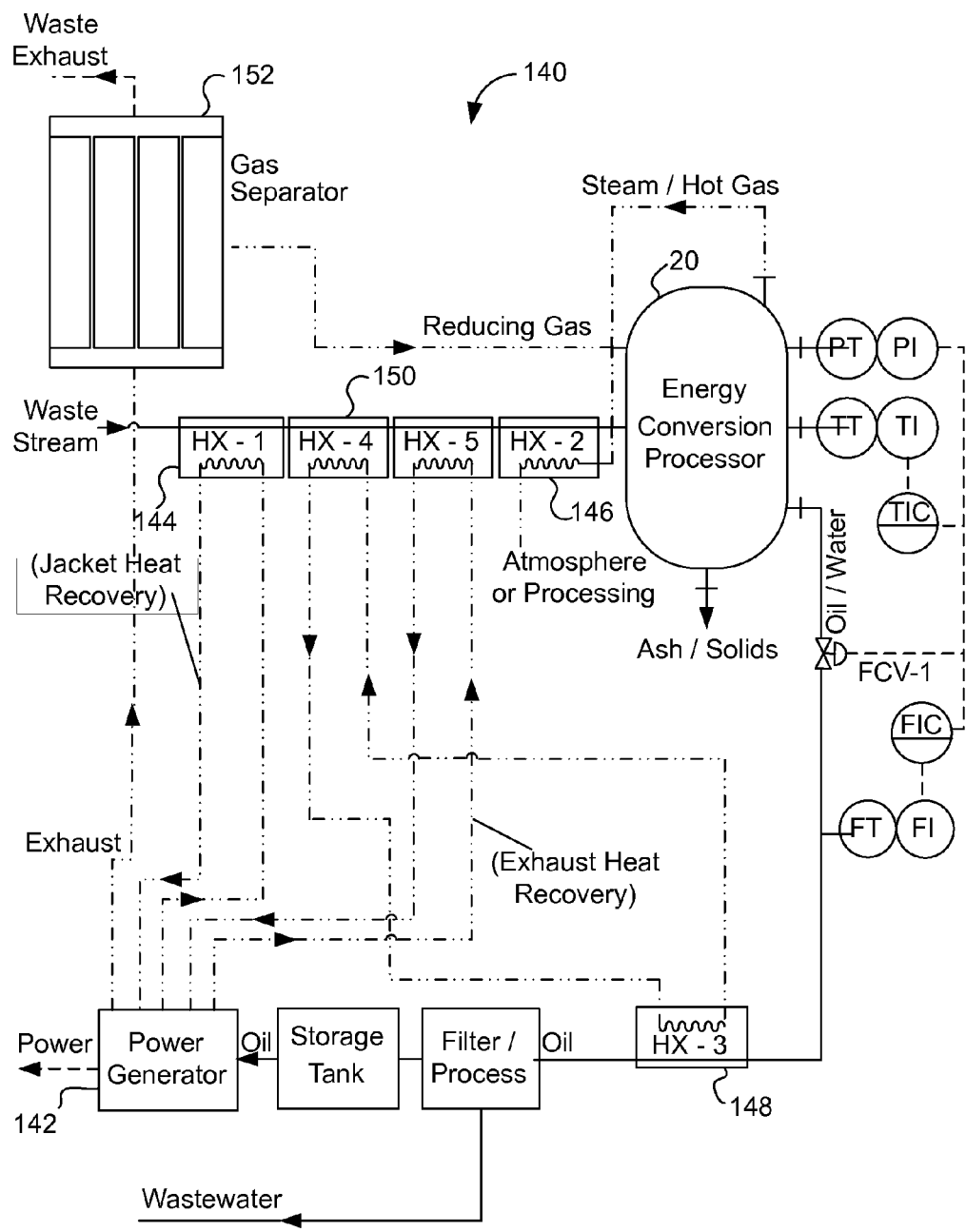
FIG. 6 is a block diagram of a portion of the system of FIG. 1, illustrating an embodiment of a heat and gas recovery sub-system.

FIG. 6 displays one embodiment of a heat recovery system 140 which may be utilize to improve and/or optimize the processes performed by the energy conversion system. In the illustrated embodiment, the waste stream is heated via heat recovered from the cooling fluid of power generator 142, typically a glycol/water mix, via heat exchanger 144. The waste is further heated in a second heat exchanger 146, using steam and/or exhaust gases available from energy conversion processor 20. These may alternately be taken from a vessel within energy conversion processor 20 or a downstream apparatus such as a flash tank as utilized in the petroleum industry.

Another source of heat recovery is shown which circulates a heat transfer medium through heat exchangers 148, 150. The heat transfer medium transfers heat from the hot fuel from energy conversion processor to the incoming waste stream, preheating it, raising overall efficiency.

Additional process control instrumentation is also illustrated in FIG. 6 by way of example only. Recovery of constituents of exhaust gases is important with certain embodiments of energy conversion processor 20. For example, one embodiment of energy conversion processors require carbon monoxide (CO) and/or carbon dioxide (CO2), which are readily available in significant quantities from the exhaust of an engine and/or combustion processes. In the embodiment shown, a portion of the exhaust gas is separated by gas separator 152 for delivery to energy conversion processor 20. The exhaust gas may be filtered, or chemically converted (for example converting CO2 into CO and O2) to deliver the desired gas or gases to energy conversion processor 20. In one embodiment, membrane technology is utilized within gas separator 152 to concentrate the amount of one gas, for example CO, for delivery into the process. Other more complex gas separation methods such as pressure-swing absorption, vacuum swing absorption, chemical separation, catalytic separation, and other gas separation methods may be utilized to accomplish the same goal of delivering a more desirable mix of gas to energy conversion processor 20. The gas separation process typically utilizes a compressor for the feed gas (exhaust), or one or more vacuum pumps.

Figure 7:
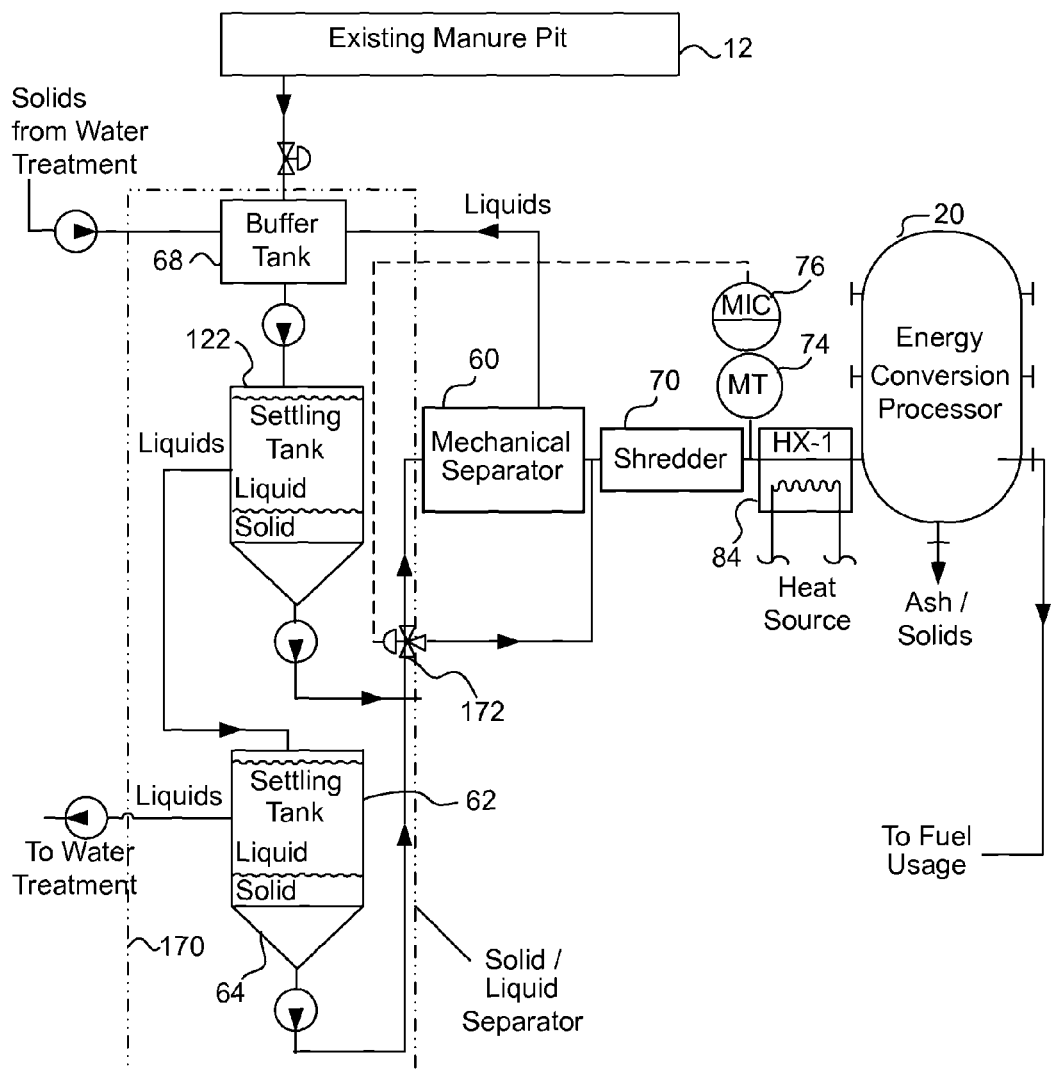
FIG. 7 is a block diagram of a portion of the system of FIG. 1, illustrating an embodiment having multiple gravity solids/liquids separators routed to a mechanical separator.

FIG. 7 illustrates another embodiment for a solids/liquids separator 170 for an energy conversion system which controls a solids percentage, primarily for a low-solids energy conversion processor 20. Solids/liquids separator 170 includes one or more gravity separators (settling tanks 62, 122 shown). The high-solids fraction of the waste from each settling tank 62, 122 is transported toward energy conversion processor 20, except that a fraction of the high-solids fraction is directed through mechanical separator 60, which raises the solids percentage of the waste to a desired level for input into energy conversion processor 20. A three-way valve 172 is controlled by the moisture controller (MIC) 76, based on an input from moisture sensor (MT) 74. Three-way valve 172 could alternately be a combination of two-way valves and/or manual valves. The liquid fraction of the waste from mechanical separator 60 can alternately be transported to buffer tank 68 or directly to one of settling tanks 62, 122.

Figure 8:
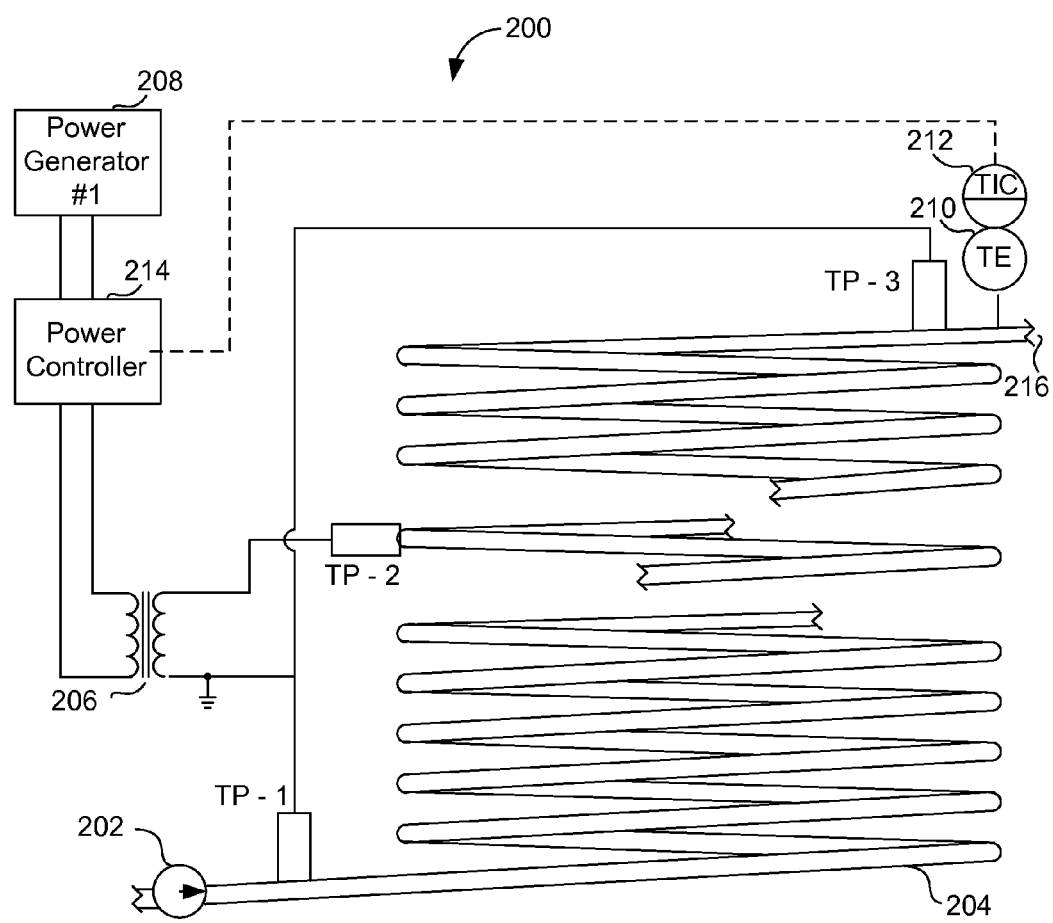
FIG. 8 is a block diagram of one embodiment of an energy conversion processor.

FIG. 8 illustrates one example of an energy conversion processor 200. In the example illustrated, pump 202 raises pressure of the waste within energy conversion processor 200. As described above, the waste has been controlled to a specified moisture level. The waste is pumped through a length of tubing 204. An example includes 1000' of 1.5 inch NPS Schedule 80 304ss with an inside diameter of about 1.5", which coiled in about a 12 foot diameter, with 27 turns. A flowrate of approximately 4.6 gpm is pumped into energy conversion processor 200. A step down transformer 206 converts 480 volt, single phase power from power 208 generator to a low voltage, for example 30 VAC. Temperature sensor 210 provides a signal to temperature controller 212. The amount of power from power generator 208 delivered to energy conversion processor 200 is controlled by power controller 214. Power controller 214, in one embodiment, is the phase angle SCR (Silicon Controlled Rectifier) type or another similar type. A specific SCR type power controller is supplied by EuroTherm. Power controller 214 delivers an amount of power to step down transformer 206 proportional to the signal received from temperature controller 212. Power controller 214 regulates the voltage applied to the primary of transformer 206, which regulates the voltage applied to energy conversion processor 200 by the same ratio. Such an arrangement maintains the temperature of the waste at the outlet 216 of energy conversion processor 200. Another embodiment, not shown, utilizes multiple zones, for example, two transformers 206, two power controllers 214, two temperature sensors 210, and two temperature controllers 212, where each zone may have differing temperature setpoints or the same temperature setpoint to have a zone of temperature rise rather then a zone of maintaining temperature.

In one embodiment, tubing 204 of energy conversion processor 200 includes a jacketed pipe wherein heat from a power generator is applied as one of heated fluid or heated gas to the jacketed pipe to maintain desired temperature setpoints. In this and other embodiments, heat from a power generator is therefore applied to the waste stream within energy conversion processor (20, 200) by one or more of impedance and induction, in one or more distinct zones of heating.

The above described embodiments are utilized to control an amount of moisture within a waste stream to attempt to provide an optimum waste for the particular energy conversion processor 20. When energy conversion processor 20 is a gasification processor, a moisture percentage entering mechanical separator 60, for example, an inclined screw press, is about 95%. The moisture percentage in the high-solids stream exiting mechanical separator 60 is about 65%. The mass fraction of solids forwarded to shredder 70 is then about 30%. The remaining 70% mass fraction of waste is forwarded to a gravity separator (e.g., settling tank 62). The solid fractions in the gravity separator are continually recycled to buffer tank 68, where it is mixed with fresh slurry and reintroduced into mechanical separator 60. For the waste stream exiting shredder 70, hot air is introduced into dryer 72 (shown in FIG. 2, and is regulated as described above to reduce the moisture percentage in the waste stream being fed to energy conversion processor 20 to about 25%.

When energy conversion processor 20 is a pyrolysis or liquification processor, a moisture percentage entering mechanical separator 60, for example, a solid bowl basket centrifuge, is about 97%. The moisture percentage in the high-solids stream exiting mechanical separator 60 is about 72%. The mass fraction of solids forwarded to shredder 70 is then about 65%. The remaining 35% mass fraction is forwarded to a gravity separator (e.g., settling tank 62). The moisture percentage of the solid fraction in the gravity separator is about 90%. The flow from gravity separator is divided at a three-way valve, with nominally 50% of the flow directed to the pipe connecting mechanical separator 60 and shredder 70. This results in a desired mixture moisture percentage of about 80% in this case. The three-way valve position is regulated as previously described, to maintain this moisture percentage setpoint. The remaining high-solids stream from the gravity separator is continually recycled to buffer tank 68, where it is mixed with fresh slurry and reintroduced into the mechanical separator.

The above described embodiments and examples serve to illustrate how control of moisture content from a waste stream is utilized by a number of different energy conversion processor types in order to provide a method for disposing of and gaining beneficial use from animal production waste streams. The above described embodiments also do not involve methods that contribute to odor released into the atmosphere, providing a more desirable approach to the problem of animal production waste than known solutions which include lagoons and field spreading.

Figure 9:
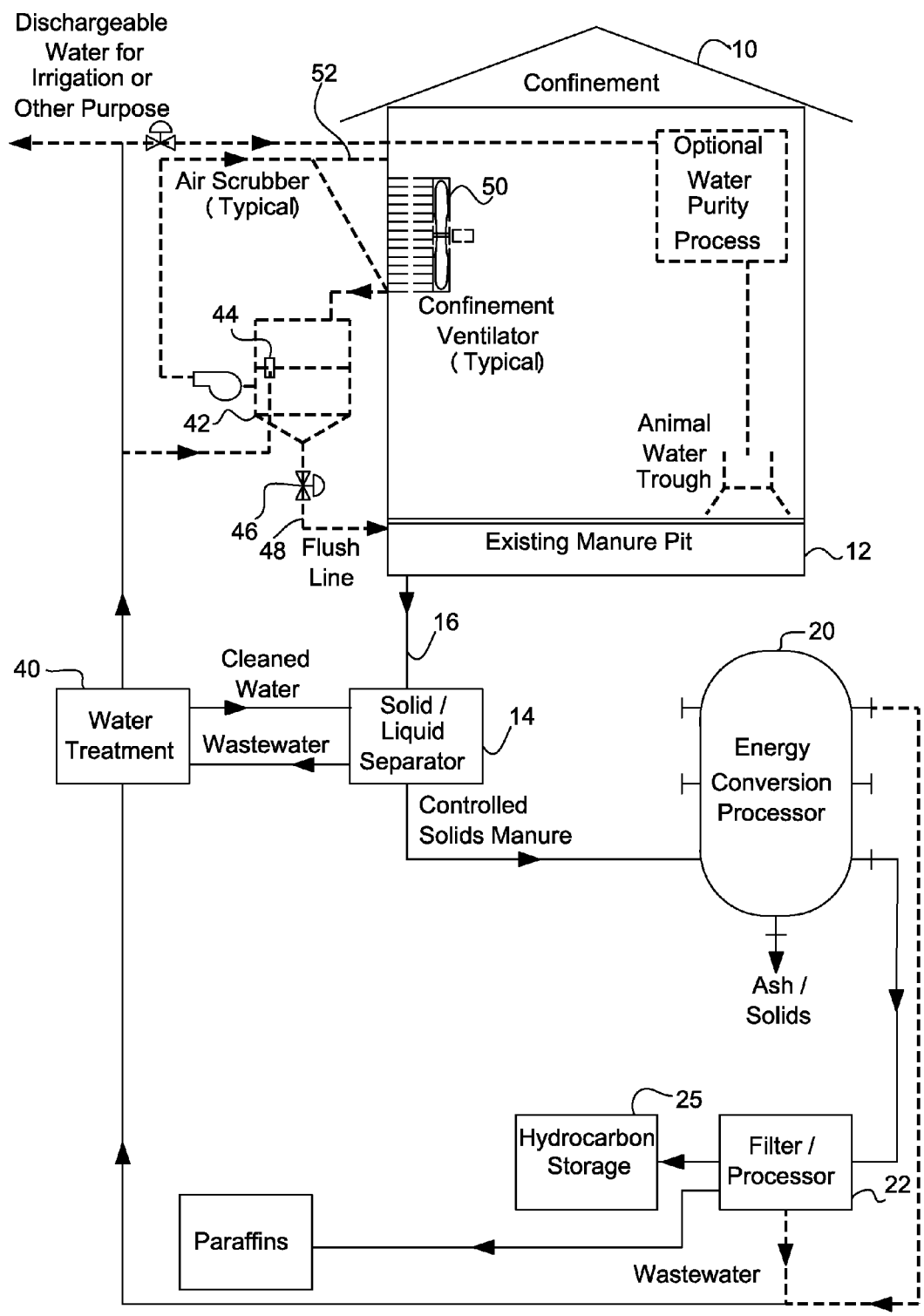
FIG. 9 is a block diagram of is an overall conversion process diagram of a system for converting a waste stream into a complex hydrocarbon.
Figure 10:
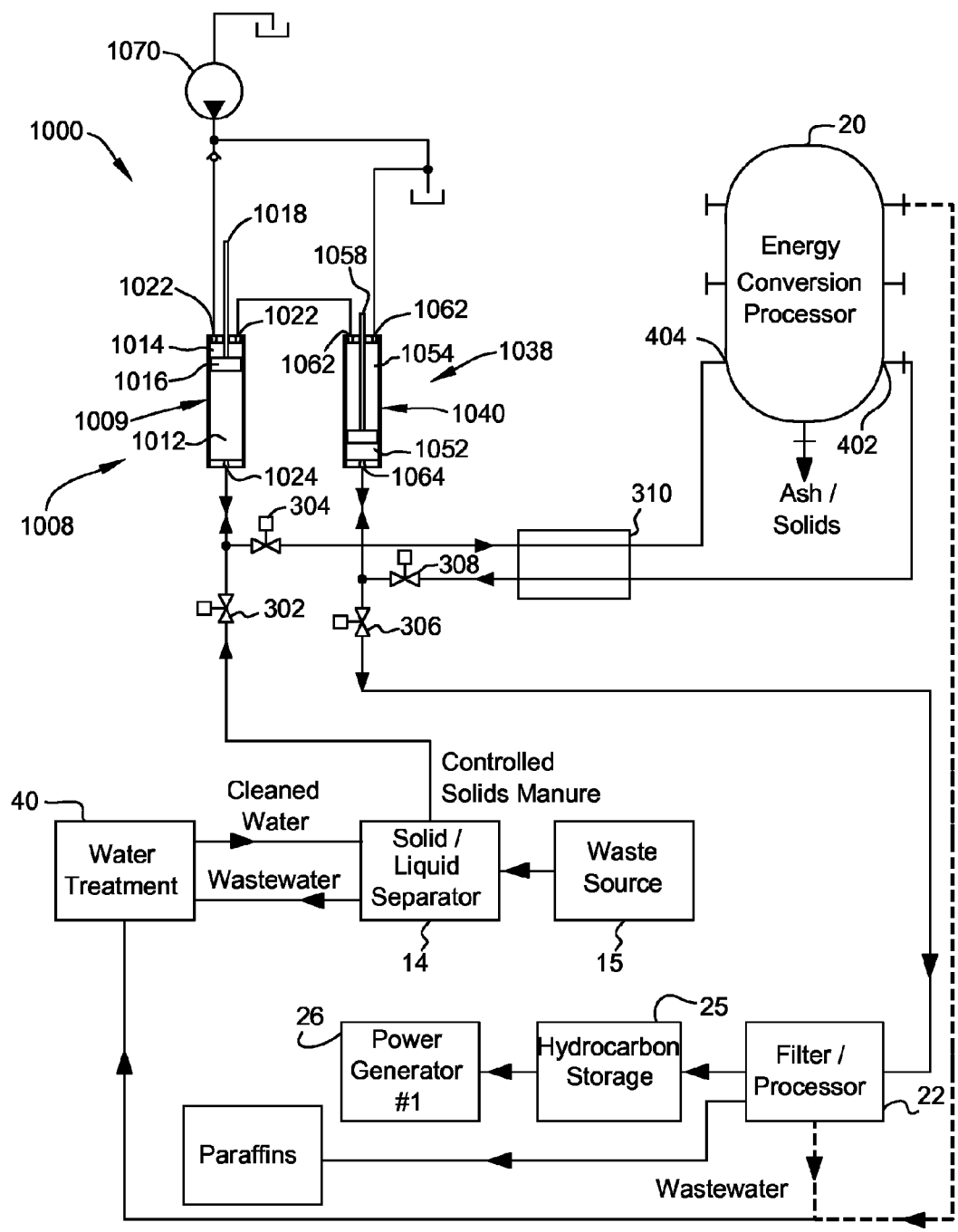
FIG. 10 is a block diagram of a portion of the system of FIG. 1, including an embodiment with a dual cylinder pump for pumping the waste stream.

While the above-described embodiments relate to the creation of fuel sources from the waste stream and subsequent use of the fuel sources for power generation, alternative embodiments utilize the energy conversion processor 20 to create complex hydrocarbons, which may be output to, for example, hydrocarbon storage 25 (shown in FIG. 9). Whether the energy conversion processor 20 converts the waste stream into a fuel source, as described in FIGS. 1-8, or a complex hydrocarbon adapted for other uses, as described in relation to system depicted in FIGS. 9 and 10, is dependent on a number of factors. For example, the temperature and/or pressure within the energy conversion processor 20 may be altered or additional substances may be input to the processor, according to some embodiments, in order to affect the chemical composition of the output (i.e., complex hydrocarbon) generated by the energy conversion processor.

The complex hydrocarbons generated by energy conversion processor 20 in the system of FIG. 9 are adapted to be suitable for a variety of applications. In one embodiment, these complex hydrocarbons are suitable to be used as an additive to, or substitute for, bitumen and petroleum-based asphalt binder.

Asphalt, as described herein is a composition of an asphalt binder mixture and an aggregate. The asphalt binder mixture binds the aggregate together. The asphalt binder mixture may contain one or more of the following (each of which is discussed in greater detail below): a petroleum-based asphalt binder, a polymer-based asphalt binder additive, or the complex hydrocarbon generated by the energy conversion processor 20 of FIG. 9.

Bitumen is a naturally occurring, viscous mixture of hydrocarbons, often found as a hydrocarbon-rich mixture in sand, clay, and water. Bitumen must first be extracted from the mixture in which it is found (i.e., sand, clay, or water) and processed before transportation to a petroleum refinery for further processing. The petroleum-based asphalt binder is but one of several mixtures of hydrocarbons in the bitumen class. It possesses strong weather and chemical resistance and is often used in paving applications or roofing applications (e.g., tar or asphalt-based shingles). Petroleum-based asphalt binder is derived from crude oil during the petroleum refining process. Of the fractions contained within a barrel of oil, petroleum-based asphalt binder is the bottom fraction that remains after all of the other fractions have been removed in the refining process.

Currently, petroleum-based asphalt binder is produced almost exclusively by petroleum refineries. The properties of the crude oil fed into the petroleum refineries often vary considerably. Accordingly, the properties of the asphalt binder produced from the crude oil vary as well. In order to account for the differences in properties of petroleum-based asphalt binder, polymer-based asphalt binder additives are often mixed with it, resulting in an asphalt binder mixture of materials that have substantially uniform properties. Different types or amounts of the polymer-based asphalt binder additives are mixed with the petroleum-based asphalt binder based on the properties of the petroleum-based asphalt binder in order to achieve an asphalt binder mixture that has substantially uniform properties.

Polymer-based asphalt binder additives are also capable of enhancing the performance characteristics of petroleum-based asphalt binder (e.g., improved high-temperature stiffness and increased low-temperature elasticity). Many polymer-based asphalt binder additives are derived from polymers produced from crude oil during a secondary chemical process. A commonly used polymer-based asphalt binder additive is styrene-butadiene-styrene (SBS).

In one exemplary embodiment, the system of FIG. 9 generates a complex hydrocarbon that is suitable for use as either a substitute for petroleum-based asphalt binder or polymer-based asphalt binder additive, or suitable for insertion as a feedstock into heavy oil streams (e.g., vacuum distillation or coker units) at a petroleum refinery. The complex hydrocarbon is generated by the system of FIG. 9 by subjecting the waste stream to a specific temperature and pressure within the energy conversion processor 20 over a prolonged period of time (e.g., thirty minutes to two hours). The complex hydrocarbon generated by the energy conversion processor 20 and the specific temperature and pressure therein has material properties similar to a petroleum-based asphalt binder.

In such an exemplary embodiment, the complex hydrocarbon generated by the specific temperature and pressure within the energy conversion processor 20 in system of FIG. 9 has a specific gravity, pour point, viscosity, and a heat of combustion similar (collectively referred to as "material properties") to that of petroleum-based asphalt binder.

The values of the material properties of the complex hydrocarbon generated by the energy conversion processor 20 can be changed by either altering the conditions within the energy conversion processor 20 or the content of the material input to the energy conversion processor. For example, the specific gravity of the complex hydrocarbon may be decreased by introducing hydrogen to the energy conversion processor 20 during the process carried out within the energy conversion processor. The hydrogen may be "bubbled" or injected into the energy conversion processor 20 in a gaseous form by a hydrogen injection mechanism. The hydrogen injection mechanism is in fluid communication with a source of hydrogen and serves to regulate the flow and pressure of hydrogen input to the energy conversion processor 20. Included in the hydrogen injection mechanism may be one or more valves, pipes, fittings, or connectors.

When introduced within the energy conversion processor 20, the hydrogen may reduce the length of hydrocarbon chains which make up the complex hydrocarbon by breaking off organic chains from the complex hydrocarbon. The corresponding reduction in the length of the chains serves to decrease the specific gravity, pour point, and viscosity while also increasing BTUs per pound of the complex hydrocarbon.

The length of the chains comprising the complex hydrocarbon is believed to be reduced by increasing the temperature and/or pressure within the energy conversion processor 20 with or without the introduction of hydrogen to the processor. Conversely, the length of the chains is believed to be increased by decreasing the temperature and/or pressure within the energy conversion processor 20. Accordingly, when one or any combination of the temperature, pressure, or residence time is increased, the carbon chains may be reduced in length compared to when one or any combination of the values is reduced.

While specific mention has been made to the similarity of the material properties of the complex hydrocarbon to those of a petroleum-based asphalt binder according to the exemplary embodiment, they should not be construed as limiting. To the contrary, a wide variety of complex hydrocarbons with varying properties may be generated by the system of FIG. 9 by altering the pressure and temperature within the energy conversion processor 20. Accordingly, the ranges and values presented herein are intended to be illustrative only and represent the material properties of but one complex hydrocarbon generated according to a specific temperature and pressure within the energy conversion processor 20.

According to some embodiments, the complex hydrocarbon may be substituted for a portion or all of the petroleum-based asphalt binder in an asphalt mixture. For example, the amount of petroleum-based asphalt binder may be reduced by a measure, and replaced by an equal measure of the complex hydrocarbon generated by the energy conversion processor 20. For example, the amount of petroleum-based asphalt binder in the asphalt mixture may be reduced by an amount (e.g., an amount accounting for 25% by weight of the petroleum-based asphalt binder) and an amount of the complex hydrocarbon substantially equal to the reduced amount may be added to the asphalt mixture. According to one exemplary embodiment, a first asphalt mixture may contain 1000 pounds of petroleum-based asphalt binder. In a second asphalt mixture mixed according to one embodiment, the amount of petroleum-based asphalt binder may be reduced to 750 pounds, and 250 pounds of complex hydrocarbons generated by the system of FIG. 9 may be substituted in place of the 250 pounds of petroleum-based asphalt binder. Other ratios are contemplated as well, with some embodiments substituting the complex hydrocarbon for most, if not all, of the required amount of petroleum-based asphalt binder for an asphalt mixture.

Furthermore, while the embodiments described above disclose a one to one correspondence (i.e., a replacement, substitution and/or combination ratio) between a weight of petroleum-based asphalt binder removed from the asphalt binder mixture and a weight of complex hydrocarbon substituted in its place, other replacements, substitution, and/or combination ratios are contemplated as well. For example, the complex hydrocarbon may exhibit properties that allow a reduced amount of it to be used in an asphalt binder mixture in comparison to a petroleum-based asphalt binder. In other embodiments, however, increased amounts of complex hydrocarbon may be required in relation to the petroleum-based asphalt binder. The replacement, substitution, and/or combination ratio may be determined by the input of the feedstock to the energy conversion processor 20, or the operation (e.g., temperature, pressure, residence) of the energy conversion processor. The replacement, substation, and/or combination ratio may also be determined based on the end use of the asphalt mixture. For example, certain high-stress end uses (e.g., highway construction) may require different ratios than less-stressful end uses (e.g., automobile driveways or pedestrian paths). In some embodiments, the end use of the asphalt mixture dictates the amount of complex hydrocarbon that may be used in the asphalt mixture.

According to some known systems, as mentioned above, polymer-based asphalt binder additives are mixed with a petroleum-based asphalt binder to modify the material properties of the resulting asphalt mixture to conform to a standard set of values. The standard set of values may comprise performance criterion set by a standards body. The material properties of petroleum-based asphalt binders are partially dependent on the material properties of the crude oil from which the binders are derived. As the material properties of crude oil can vary substantially based on a number of factors (e.g., extraction method utilized, geographic source of the crude oil, etc.), the material properties of the binder derived therefrom can vary as well. Accordingly, the polymer-based asphalt binder additives function to ensure that the asphalt mixture they are introduced into conforms to a standard set of values for the material properties, regardless of the material properties of the crude oil used to derived the binder. Polymer-based asphalt binder additives may account for between 1% and 20% by weight of the asphalt binder mixture, and in some embodiments between 2% and 10% by weight of the asphalt binder mixture, while in still in other embodiments they may account for less than 5% by weight. In some embodiments, the complex hydrocarbon may comprise between 2% and 98% by weight of the asphalt binder mixture, while in others it may comprise between 1% and 25%, and while in still others it may comprise greater than 5% by weight.

In some embodiments, the complex hydrocarbon may be mixed with a reduced ratio of a polymer-based asphalt binder additive and the other components of the mixture to form an asphalt binder mixture. Thus, in some embodiments, the complex hydrocarbon may reduce the amount of polymer-based asphalt binder additive needed in the asphalt, while in other embodiments the complex hydrocarbon may function as a substitute for at least a portion of the polymer-based asphalt binder additive.

In embodiments where the complex hydrocarbon functions, at least in part, as a substitute for the polymer-based asphalt binder additive, the ratio of the polymer-based asphalt binder additive may be in the range of 1% to 20% by weight to the other components of the asphalt binder mixture, while in other embodiments it may be less than 5% by weight. In one embodiment, the ratio of the polymer-based asphalt binder additive may be about 3%. The ratio of the complex hydrocarbon to the other components of the asphalt binder mixture may be varied to coincide with the reduced ratio of polymer-based asphalt binder additive. For example, if the polymer-based asphalt binder additive ratio in a previous asphalt binder mixture was 12% and in a replacement asphalt binder mixture it is 5%, an amount of complex hydrocarbon equal to 7% by weight will be present in the replacement asphalt binder mixture. Reduction in the amount of polymer-based asphalt binder additive utilized in asphalt binder mixtures is beneficial as the cost of the additive per unit weight is significantly greater than the complex hydrocarbon and the petroleum-based asphalt binder.

While the substitution of the complex hydrocarbon for polymer-based asphalt binder additives and petroleum-based asphalt binders has been described separately above, other embodiments contemplate the reduction of the amount of both the additive and the binder and the addition of the complex hydrocarbon. Although specific mention has been made to ranges of the ratio of the hydrocarbon mixture to other components in the asphalt binder mixture, they should not be construed as limiting. To the contrary, any variety of ranges may be utilized and the ranges presented herein are intended to be illustrative only. Furthermore, some embodiments may utilize the complex hydrocarbon for a complete substitute of the traditional, petroleum-based asphalt binder.

In embodiments utilizing at least a portion of the complex hydrocarbon in a traditional asphalt binder mixture, marked improvements are recognized over other asphalt binder mixtures which comprise a petroleum-based asphalt binder, aggregate, and polymer-based asphalt binder additives. For example, in traditional petroleum-based asphalt binder mixtures, dispersing the polymer-based asphalt binder additives therein requires substantial mixing efforts in both time and the shear force required to adequately disperse the additive. However, addition of the complex hydrocarbon reduces the duration of both the mixing operation and the shear force required to disperse the polymer additive. Furthermore, the complex hydrocarbon may increase adhesion between the components of the asphalt binder mixture and the aggregate that is subsequently combined with the mixture.

In some embodiments, the material properties of the complex hydrocarbon generated by the energy conversion processor 20 are similar to those of coal tar pitch. Coal tar pitch is one of the byproducts produced when coal is carbonized to produce coke or gasified to produce coal gas. While coal tar pitch may be used as an ingredient of an asphalt binder mixture, it contains heavy metals like mercury or cadmium. In contrast, the complex hydrocarbon may contain only trace amounts, if at all, of heavy metals. Moreover, coal tar pitch is generated by an energy-intensive process (e.g., carbonizing of coal) resulting in increased expense when compared to the generation of the complex hydrocarbon by the energy conversion processor 20.

Asphalt (i.e., aggregate and an asphalt binder mixture comprising one or more of: petroleum-based asphalt binder, polymer-based asphalt binder additives, and the complex hydrocarbon) including the complex hydrocarbon is believed to possess markedly better properties than asphalt which does not include the complex hydrocarbon due to the inclusion of the complex hydrocarbon. Asphalt binder containing the complex hydrocarbon generated by the energy conversion processor 20 has been analyzed. A typical asphalt binder that did not contain the complex hydrocarbon, but which was still comprised of the same type of petroleum-based asphalt binder and polymer-based asphalt binder additives typically receives a rating of "compliant" or "high compliance" utilizing Dynamic Shear Rheometer (DSR) testing. A sample of asphalt binder comprising a complex hydrocarbon generated by the energy conversion processor 20, a petroleum-based asphalt binder additive, and a polymer-based asphalt binder additive received a rating of "excessive compliance" on the DSR apparatus, a markedly better rating than "high compliance" indicating more desirable rheological properties.

In some embodiments, the asphalt containing an asphalt binder mixture including the complex hydrocarbon is used in paving operations (e.g., constructions of roads, parking lots, etc.), while in others it may be used in roofing products (e.g., asphalt shingles or roofing tar substitutes) or as a filler for cracks in asphalt surfaces. When used in paving operations and as a crack filler, the complex hydrocarbon-containing asphalt mixture may exhibit improved rigidity in hot-weather conditions and increased elasticity in cold-weather conditions. It has been found that the complex hydrocarbon possessed tenacious adhesion to surfaces which may portend to its use as a crack filler in asphalt surfaces.

In the embodiment depicted in FIG. 10, a multi-chambered dual-cylinder pump pumps the waste stream into the energy conversion processor 20 and extracts the complex hydrocarbon (referred to as "fuel" in relation to FIGS. 1-8) therefrom. For purposes of discussion with regards to the slurry pump, the material extracted from the energy conversion processor 20 (i.e., the complex hydrocarbon) will be referred to as an "effluent".

With reference now to FIG. 10, a schematic view of a multi-chambered pumping system (referred to generally as 100) is presented in accordance with one embodiment of the present invention. Slurry is supplied to the slurry pumping system 100 from solid/liquid separator 14 and effluent is discharged to the filter/processor 22. Both the solid/liquid separator 14 and the filter/processor 22 may be open to the atmosphere and consequently at or near atmospheric pressure, or they may be enclosed and maintained at another suitable pressure. In the embodiment depicted in FIG. 10, slurry is provided to the solid/liquid separator 14 by the waste source 15. Included in the waste source 15 are the animal wastes and other liquids collected from the manure pit 12 (depicted in FIG. 1). While specific mention is made herein to the use of slurry as source substance for the multi-chambered pumping system 100, the pumping system is not limited to the pumping of slurry. To the contrary, the pumping system 100 may pump a variety of liquids or other substances containing solids.

In some embodiments, the solid/liquid separator 14 may be positioned such that slurry is able to drain from the solid/liquid separator and into other portions of the slurry pumping system 100 with only the aid of gravity. In one embodiment, pumps or conveyors may also be used in addition to or instead of gravity to transport the slurry from the solid/liquid separator 14. As used herein, the term "transport" is utilized to describe methods for moving mass from one location to another, including, but not limited to: pumping, gravity, auger, conveyor, and the like.

For the purposes of discussion herein, the slurry provided by the solid/liquid separator 14 is referred to as a "source substance".

As seen in FIG. 10, the pump system 100 includes an input portion 108 and an effluent portion 138. The input portion 108 includes an input cylinder 110 having an inner diameter. Source substance input valve 202 controls the flow of source substance from the solid/liquid separator 14 into a input process section 112 of the input cylinder 110 through an input cylinder input port 124. An input piston 116 separates the input process section 112 from a fluid section 114. Attached to the input piston 116 is an input cylinder guide rod 118. The input cylinder guide rod 118 extends through a portion of the fluid section 114 and has a first diameter associated therewith. Working fluid enters and exits the fluid section 114 of the input cylinder 110 through inlet and exhaust ports 122.

As the input piston 116 moves along a longitudinal axis of the input cylinder 110, the volumes of the input process section 112 and fluid section 114 change in volume in inverse relation to one another. Source substance will flow into the input process section 112 (provided a supply of slurry is available from the solid/liquid separator 14) when the pressure of the working fluid is less than the pressure of the source substance. Conversely, source substance will flow out of the input process section 112 (provided a fluid communication means is available) when the pressure of the source substance is less than the pressure of the working fluid in the fluid section 114.

The longitudinal position of the input cylinder guide rod 118 relative to a fixed point can be measured and monitored in some embodiments by an input cylinder LVDT (linear variable differential transducer) 126. In other embodiments, different mechanisms (e.g., string pots) may be used to monitor the linear position of the input cylinder guide 118.

Seals or rings (not shown) may surround the input piston 116 and prevent source substance or working fluid from coming into contact with each other as the piston moves along the longitudinal axis of the input cylinder 110. Additionally the components comprising the input portion 108 of the pump system 100 may be formed from any number of suitable materials (e.g., metal).

The effluent portion 138 of the pump system 100 includes an effluent cylinder 140 having an inner diameter. In some embodiments, the inner diameter of the effluent cylinder 140 and the input cylinder 110 are substantially equal, while in other embodiments they may differ by a small amount, (e.g. less than a tenth or quarter of an inch). Effluent enters and exits an effluent process section 152 of the effluent cylinder 140 through an effluent cylinder input port 164. An effluent piston 156 separates the effluent section from a fluid section 154. Attached to the effluent piston 156 is an effluent cylinder guide rod 158. The effluent cylinder guide rod 158 extends through a portion of the fluid section 154 and has a second diameter associated therewith. Working fluid enters and exits the fluid section 154 of the effluent cylinder through inlet and exhaust ports 162.

The longitudinal position of the effluent cylinder guide rod 158 relative to a fixed point can be measured and monitored in some embodiments by an input cylinder LVDT (linear variable differential transducer) 166. In other embodiments, different mechanisms (e.g., string pots) may be used to monitor the linear position of the effluent cylinder guide 158.

Seals or rings (not shown) may surround the effluent piston 156 and prevent effluent or working fluid from coming into contact with each other as the piston moves along the longitudinal axis of the effluent cylinder 140. Additionally the components comprising the effluent portion 138 of the pump system 100 may be formed from any number of suitable materials (e.g., metal).

Connecting the fluid sections 114 and 154 of the input cylinder 110 and the effluent cylinder 140 are fluid connection components (e.g., piping or hoses) that provide fluid communication between the fluid sections 114 and 154. One or more valves (not shown) control the flow of working fluid between the fluid sections 114 and 154 and a working fluid pump 170 and associated reservoir (not shown). As discussed in greater detail below, the pressure associated with output of effluent from the energy conversion processor is utilized to transfer working fluid between the fluid sections 114 and 154 in order to reduce the amount of working fluid that is provided by the working fluid pump 170 to pump source substance from the input cylinder 110 into energy conversion process 20. The utilization of the pressure of the effluent to aid in pumping source substance into the energy conversion processor significantly reduces the power consumption of the working fluid pump 170.

Returning now to the pumping system 100, source substance exit valve 304 controls the flow of source substance from the input process section 112. Upon closing of the source substance input valve 302 and opening of the source substance exit valve 304, source substance can travel through various pipes or other fluid communication systems to an input 404 of the energy conversion processor 20. The source substance then travels through the energy conversion processor 20 before exiting as effluent at an output 402 of the energy conversion processor. As described above, once inside the energy conversion processor 20, the source substance (i.e., slurry) may be subjected to elevated temperature or pressure for some duration and converted to the above-mentioned effluent.

An effluent exit valve 308 controls the flow of effluent from the energy conversion processor 20 through the output 402 therein to an effluent inlet port 164 to the effluent section 152 of the effluent cylinder 140. Upon opening of the effluent exit valve 308 and closing of an effluent dump valve 306, effluent is able to flow from the energy conversion processor 20 to the effluent section 152, thus raising the effluent piston 156 and displacing working from the fluid section 154 of the effluent cylinder 140.

The amount of heat required to be input to the energy conversion processor 20 is reduced through the use of a heat exchanger 310. In some embodiments, the slurry passes through the heat exchanger 310 before entering the energy conversion processor 20. Effluent subsequently passes through the heat exchanger after exiting the energy conversion processor 20. The heat exchanger 310 transfers heat from the effluent exiting the energy conversion processor 20 to the slurry entering the energy conversion processor, thus reducing the amount of heat that the energy conversion processor must provide to the slurry.

The first diameter associated with input cylinder guide rod 118 is less than that of the second diameter associated with the effluent cylinder guide rod 158. The difference in diameters between the guide rods 118 and 158 serves to compensate for a pressure difference between a pressure associated with a source substance input into the energy conversion processor 20 from the input cylinder 110 and a pressure associated with the effluent contained within the energy conversion processor and output to the effluent cylinder 140. According to other embodiments, the first diameter associated with the input cylinder guide rod 118 is substantially equal to that of the second diameter associated with the effluent cylinder guide rod 158 and additional pressurized working fluid is provided by working fluid pump 170.

Referring now to FIG. 11, a flow diagram 1100 is provided that illustrates a method for pumping a source substance (e.g., a slurry) into a energy conversion processor and receiving an effluent as output from the energy conversion processor, in accordance with another embodiment. In operation of the pumping system, there are two distinct cycles. A first cycle includes receiving 1110 source substance into an input process section of the input cylinder and a corresponding discharging 1120 of effluent from an effluent process section of the effluent cylinder. The second cycle includes discharging 1130 of source substance from the input process section of the input cylinder into the energy conversion processor and corresponding receiving 1140 of the effluent in the effluent process section of the effluent cylinder from the energy conversion processor. Accordingly, while the steps depicted in blocks 1110 and 1120 are depicted as separate operations, they occur substantially simultaneously and may be performed simultaneously. Likewise, the steps depicted in blocks 1130 and 1140 occur substantially simultaneously and may accordingly be performed as such.

For purposes of discussion herein, it will be assumed that the energy conversion processor is acting in a steady-state operation wherein the source substance level within the energy conversion processor is at its operating capacity. During initial startup of the pump system when the energy conversion processor is substantially empty or the source substance level is below operating capacity, multiple pumping operations by the input cylinder alone (e.g., without corresponding withdrawal of effluent from the energy conversion processor) may be required to "charge" the energy conversion processor with source substance. In some embodiments, the pumping operation may cease after the charging of the energy conversion processor is complete to allow the energy conversion processor the requisite time to change the chemical composition of the source substance into the effluent. Further, it is assumed that the method described below, which begins with the filing of the input cylinder, that the effluent cylinder has already been filled with effluent output from the energy conversion processor.

The method depicted in FIG. 11 begins with the receiving 1110 of source substance into the input process section of the input cylinder. As described above, one example of the source substance is a slurry. The source substance may be conveyed into the input process section by the force of gravity, wherein a source of the source substance is positioned above the input to the input process section. In other embodiments, different conveying mechanisms may be used to feed source substance into the input process section, such as augers or conveyers. One or more valves may control the flow of source substance into the input process section, and accordingly are opened to permit the flow source substance into the input process section. After the input process section has been filled with source substance, the one or more valves are closed.

Effluent is discharged 1120 from the effluent process section of the effluent cylinder into an effluent vat in fluid communication therewith. To discharge effluent from the vat, one or more valves controlling the output from the effluent process section of the effluent cylinder are opened, thus permitting the effluent to travel to the effluent vat through any suitable fluid connection components (e.g., pipes, hoses, troughs, etc.). The effluent is then subjected to additional processes (e.g., separation or drying operations).

As effluent is discharged from the effluent process section, the effluent cylinder piston travels along the longitudinal axis of the effluent cylinder, thus reducing the volume of the effluent process section and increasing the volume of the fluid section. Additional working fluid is directed into the fluid section from the input cylinder's fluid section as the input process section of the input cylinder is filled with source substance. One or more valves may control the flow of working fluid between the fluid sections of the input and effluent cylinders. After the effluent has discharged from the effluent process section, the one or more valves controlling the output from the effluent process section are closed.

The source substance is pumped or discharged 1130 into the energy conversion processor from the input process section of the input cylinder. Coincident with the initiation of pumping the source substance into the energy conversion processor, a valve controlling the flow of source substance along a pipe or hose into the energy conversion processor is opened. To pump the source substance from the input process section, working fluid in the fluid section acts against the input piston, thus forcing it to move along the longitudinal axis of the input cylinder. When the pressure of the working fluid in the fluid sections exceeds that of the source substance in the input process section, the volume of the input process section begins to decrease as the working fluid moves the input piston.

In some embodiments, the source substance is input into the energy conversion processor at an elevated pressure, and accordingly is pumped at this elevated pressure into the energy conversion processor. A guide rod is attached to the input piston and extends through the fluid section thus reducing the surface area of the input piston on which the working fluid is able to act. Accordingly, the pressure of the working fluid exceeds the pressure of the source substance being pumped out of the input process section. Working fluid is supplied to the fluid section of the input cylinder from the fluid section of the effluent cylinder, as described in greater detail below. Working fluid is also provided by the working fluid pump. In embodiments that utilize hydraulic fluid as a working fluid, the working fluid pump is a hydraulic pump.

Effluent is received 1140 into the effluent process section of the effluent cylinder from the energy conversion processor. As described above, effluent is output from the energy conversion processor at an elevated pressure, often slightly less than that of source substance input into the energy conversion processor. The decrease in pressure is a result of numerous factors including, but not limited to: frictional losses in the energy conversion processor or chemical changes occurring in the source substance.

In order to receive effluent into the effluent process section, one or more valves are opened that control the flow of effluent into the effluent process section. In some embodiments, the flow of effluent from the energy conversion processor to the effluent process reaction is effectuated by one or more pipes, hoses, or tubes.

One or more valves controlling the flow of working fluid into and out of the fluid section of the effluent cylinder may be opened. As the effluent fills the effluent process section, it acts against the effluent piston, which in turn acts against the working fluid. The guide rod attached to effluent piston extends through the fluid section, thus reducing the surface area of the piston adjacent to the fluid section. Accordingly, when the effluent acts against one side of the piston, the pressure associated with the working fluid on the other side of the piston is greater than the pressure of the effluent. In hydraulic systems, this concept is sometimes referred to as pressure amplification. As the pressure is determined by the force applied divided by the surface area of the piston, a larger guide rod reduces the surface area of the piston and increases the pressure amplification.

In some embodiments, the inner diameter of the input and effluent cylinders are substantially equal and the effluent cylinder guide rod has a larger diameter than the input cylinder guide rod. Accordingly, when the effluent acts upon the effluent piston, the pressure of the working fluid in the corresponding fluid section is greater than the pressure associated with the effluent. As effluent fills the effluent process section and acts against the piston, working fluid is directed from the fluid section via one or more pipes or hoses to the fluid section of the input cylinder.

As described above, the diameters of the input cylinder guide rod and the effluent cylinder guide are operable to compensate for the difference in pressure of the source substance input into the energy conversion processor and effluent output from the energy conversion processor. The difference in diameters between the guide rods are sized to amplify the pressure of the working fluid in the fluid section of the effluent cylinder to the pressure required in the fluid section of the input cylinder to pump source substance into the energy conversion processor at the desired pressure. To accomplish this, the diameter of the effluent cylinder guide rod is larger than the input cylinder guide rod. In other embodiments, the diameters of the effluent cylinder guide rod and the input cylinder guide rod are substantially equal. In these embodiments, additional pressurized working fluid is supplied to account for the pressure differential between the effluent output from the energy conversion processor and the source material input to the energy conversion processor.

As the diameter of the effluent cylinder guide rod is larger than the input cylinder guide rod in some embodiments, the amount of working fluid directed from the fluid section of the effluent cylinder to the fluid section of the input cylinder is less than that required to pump the source substance. Accordingly, additional working fluid is supplied by the working fluid pump and associated reservoir when source substance is pumped from the input cylinder and effluent is simultaneously received in the effluent cylinder. The volume of the additional working fluid required is approximately equal to the difference in volume between the two fluid sections caused by the differently sized guide rods. However, in some embodiments the diameters of the guide rods are substantially equal and accordingly additional pressurized working fluid is required over that required for the other described embodiment.

In the other phase of the pumping cycle, discussed in relation to receiving 1110 and discharging 1120, working fluid is directed from the fluid section of the input cylinder to the fluid section of the effluent cylinder. As the fluid section in the effluent cylinder is lesser in volume than that of the input cylinder fluid section, the excess working fluid is directed to a reservoir. Upon initiation of the other phase of the pumping cycle, the working fluid pump uses working fluid contained in the reservoir.

In some embodiments, the heat exchanger described above may be utilized. The heat exchanger transfers heat between the effluent output from the energy conversion processor and the source substance input to the energy conversion processor. Accordingly, source substance passes through the heat exchanger before entering the energy conversion processor and effluent passes through the heat exchanger after exiting the energy conversion processor. The heat exchanger is useful in embodiments wherein the source substance is subjected to an elevated temperature in the energy conversion processor, and effluent is subsequently output from the energy conversion processor at an elevated temperature. The utilization of the heat exchanger permits a portion of the heat associated with the effluent to be transferred to the source substance, thus reducing the amount of heat required for operation of the energy conversion processor.

While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for processing a waste stream from animal production confinements and other sources of concentrated wastes into a complex hydrocarbon, said system comprising:
    a solids/liquids separator receiving the waste stream and configured to separate the waste stream into a solid waste stream and a liquid waste stream, the solid waste stream having a lower percentage of liquid than the liquid waste stream;
    a control system for selectively controlling an amount of moisture in the solid waste stream; and
    an energy conversion processor for receiving the moisture controlled solid waste stream and converting the solid waste stream into the complex hydrocarbon;
    wherein the complex hydrocarbon has a specific gravity, pour point, viscosity and a heat of combustion similar to that of petroleum-based asphalt binder;
    whereby the complex hydrocarbon is suitable for use as an additive to, or substitute for, bitumen and petroleum-based asphalt binder in an asphalt mixture.

2. The system of claim 1 wherein the energy conversion processor is configured to convert the solid waste stream into the complex hydrocarbon by subjecting the solid waste stream to a specific temperature and pressure within the energy conversion processor.

3. The system of claim 2 wherein the temperature and pressure within the energy conversion processor are operable to convert the solid waste stream into a complex hydrocarbon having material properties similar to those of a petroleum-based asphalt binder.

4. The system of claim 3 wherein the temperature and pressure within the energy conversion process are configured to convert the solid waste stream into a complex hydrocarbon that is further suitable as an additive to an asphalt crack sealant and a substitute for at least a portion of a polymer-based asphalt binder additive.

5. The system of claim 1 wherein the energy conversion processor uses one or more conversion processes that utilize controlled temperature, pressure or time to convert the solid waste stream into the complex hydrocarbon.

6. The system of claim 1 wherein the control system is configured to control at least one of a temperature and a pressure within the energy conversion processor.

7. The system of claim 1 further comprising a hydrogen injection mechanism configured to introduce hydrogen to the energy conversion processor.

8. An asphalt binder mixture comprising:
- a complex hydrocarbon produced from a waste stream from animal production confinements and other sources of concentrated waste;
- a polymer-based asphalt binder additive; and
- a petroleum-based asphalt binder.

9. The asphalt binder mixture of claim 8 wherein the complex hydrocarbon is produced by a method comprising:
- separating liquids and solids included in the waste stream into a solid waste stream and a liquid waste stream, the solid waste stream having a lower percentage of liquids than the liquid waste stream;
- controlling an amount of moisture in the solid waste stream such the amount of moisture in the solid waste stream is compatible with an energy conversion process; and
- feeding the moisture controlled solid waste stream into the energy conversion process, wherein the energy conversion process is adapted to convert the moisture controlled solid waste stream into the complex hydrocarbon.

10. The asphalt binder mixture of claim 8 wherein the complex hydrocarbon has material properties similar to the petroleum-based asphalt binder.

11. The asphalt binder mixture of claim 8 wherein the mixture comprises, by weight:
- 1% to 50% complex hydrocarbon;
- 1% to 20% polymer-based asphalt binder additive; and
- 25% to 98% petroleum-based asphalt binder.

12. An asphalt mixture comprising:
- an asphalt binder produced from animal waste subjected to an energy conversion process;
- an aggregate; and
- a polymer-based asphalt binder additive.

13. The asphalt mixture of claim 12 wherein the asphalt binder is produced by a method comprising:
- controlling an amount of moisture in a solid waste stream obtained from animal waste such that the amount of moisture in the solid waste stream is compatible with the energy conversion process; and
- feeding the moisture controlled solid waste stream into the energy conversion process, wherein the energy conversion process is adapted to convert the moisture controlled solid waste stream into a complex hydrocarbon.

14. The asphalt mixture of claim 12 wherein the energy conversion process has a specific temperature and pressure associated therewith.

15. The asphalt mixture of claim 12 further comprising a petroleum-based asphalt binder.

16. An asphalt mixture comprising:
- an asphalt binder produced from animal waste subjected to an energy conversion process;
- an aggregate; and
- a petroleum-based asphalt binder.

17. The asphalt mixture of claim 16 further comprising a polymer-based asphalt binder additive.

18. The asphalt mixture of claim 16 wherein the asphalt binder is produced by a method comprising:
- controlling an amount of moisture in a solid waste stream obtained from animal waste such that the amount of moisture in the solid waste stream is compatible with the energy conversion process; and
- feeding the moisture controlled solid waste stream into the energy conversion process, wherein the energy conversion process is adapted to convert the moisture controlled solid waste stream into a complex hydrocarbon.

19. The asphalt mixture of claim 16 wherein the energy conversion process has a specific temperature and pressure associated therewith.

20. An asphalt binder comprising:
- a complex hydrocarbon produced from animal waste, wherein the complex hydrocarbon has a specific gravity, pour point, viscosity and a heat of combustion similar to that of petroleum-based asphalt binder and is therefore suitable for use as an additive to, or substitute for, bitumen and petroleum-based asphalt binder in an asphalt mixture.

21. The asphalt binder of claim 20 wherein the complex hydrocarbon is produced from animal waste by subjecting the animal waste to an energy conversion process having a specific temperature and pressure associated therewith.

22. A complex hydrocarbon generated from an animal waste system and other sources of concentrated wastes, wherein the complex hydrocarbon generated has material properties similar to that of petroleum-based asphalt binder, thereby rendering the complex hydrocarbon suitable for use as a portion of an asphalt binder mixture.

* * * * *